United States Patent
Ziemer et al.

(10) Patent No.: US 7,045,055 B2
(45) Date of Patent: May 16, 2006

(54) METHOD OF OPERATING A WORMGEAR DRIVE AT HIGH ENERGY EFFICIENCY

(75) Inventors: James N. Ziemer, Martinez, CA (US); Susan M. Abernathy, Hercules, CA (US); John M. Rosenbaum, Richmond, CA (US); Stephen J. Miller, San Francisco, CA (US); Mark E. Okazaki, Alameda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 5 days.

(21) Appl. No.: 10/835,219

(22) Filed: Apr. 29, 2004

(65) Prior Publication Data
US 2005/0241990 A1 Nov. 3, 2005

(51) Int. Cl.
*C10M 101/02* (2006.01)
*C10M 105/02* (2006.01)

(52) U.S. Cl. ............... 208/18; 208/19; 208/950; 508/110; 508/591

(58) Field of Classification Search ............ 208/18, 208/19, 950
See application file for complete search history.

(56) References Cited

U.S. PATENT DOCUMENTS

| | | | |
|---|---|---|---|
| 4,634,543 A | | 1/1987 | Okada et al. |
| 4,827,064 A | | 5/1989 | Wu |
| 5,362,378 A | * | 11/1994 | Borghard et al. ........ 208/138 |
| 5,565,086 A | * | 10/1996 | Cody et al. ................ 208/27 |
| 6,096,940 A | * | 8/2000 | Wittenbrink et al. ...... 585/750 |
| 6,103,099 A | * | 8/2000 | Wittenbrink et al. ...... 208/27 |
| 6,475,960 B1 | * | 11/2002 | Berlowitz et al. ......... 508/110 |
| 6,627,779 B1 | * | 9/2003 | O'Rear ..................... 585/302 |

(Continued)

FOREIGN PATENT DOCUMENTS

| | | |
|---|---|---|
| EP | 0 973 854 | 5/2002 |
| WO | WO95/24458 | 9/1995 |
| WO | WO 02/064710 A2 * | 8/2002 |
| WO | WO 03/091369 | 11/2003 |

OTHER PUBLICATIONS

U.S Appl. No. 10/704,031, filed Nov. 7, 2003, Miller.

(Continued)

*Primary Examiner*—Ellen M. McAvoy
(74) *Attorney, Agent, or Firm*—James W. Ambrosius; Alan W. Klaassen; Susan M. Abernathy

(57) ABSTRACT

This invention is directed to a method of operating a wormgear drive at high energy efficiency comprising filling an oil reservoir with a wormgear lubricant comprising an isomerized Fischer-Tropsch derived distillate fraction having a low traction coefficient and operating the wormgear drive with the filled oil reservoir at an equilibrium temperature between 20 and 225 degrees C. This invention is also directed to a process for reducing the traction coefficient of a higher-traction coefficient lubricating base oil by blending it with an isomerized Fischer-Tropsch derived distillate fraction. This invention is also directed to a wormgear lubricant comprising an isomerized Fischer-Tropsch distillate fraction and between 2 and 50 weight percent thickener.

46 Claims, 5 Drawing Sheets

U.S. PATENT DOCUMENTS

| | | | |
|---|---|---|---|
| 6,703,353 B1 * | 3/2004 | Lok et al. | 508/110 |
| 6,833,065 B1 * | 12/2004 | O'Rear | 208/19 |
| 2003/0020775 A1 | 1/2003 | Sullivan et al. | |
| 2004/0094453 A1 | 5/2004 | Lok et al. | |

OTHER PUBLICATIONS

L.A. Bronshteyn and J.H. Kreiner, "Energy Efficiency of Industrial Oils," STLE paper 99-AM-2, (1999).

Dudley's Gear Handbook, $2^{nd}$ Edition, D.P. Townsend, ed., McGraw Hill, Inc., (1992), p. 12:11.

W.R. Murphy et. al., "The Effect of Lubricant Traction on Wormgear Efficiency," AGMA p. 254.33 (1981).

C.L. Bullock, "Innovations in Synthetic Lubricant Basestocks," ICIS-LOR World Base Oil Conference (2004).

ExxonMobil Chemical presentation titled "SpectraSyn Ultra™ —The Ultra Performance PAO," copyright 2003.

* cited by examiner

METHOD OF OPERATING A WORMGEAR DRIVE AT HIGH ENERGY EFFICIENCY

FIELD OF THE INVENTION

This invention is directed to a method of operating a wormgear drive at high energy efficiency utilizing an isomerized Fischer-Tropsch distillate fraction having a low traction coefficient, a process for reducing the traction coefficient of a higher-traction coefficient lubricating base oil, and to a wormgear lubricant composition.

BACKGROUND OF THE INVENTION

Wormgears are used when large gear reductions are needed. It is common for wormgears to have reductions of 20:1, and even up to 300:1 or greater. A worm is used to reduce speed and increase torque. For each complete turn of the worm shaft the gear shaft advances only one tooth of the gear. Unlike ordinary gears, the motion is not reversible, a worm can drive a gear to reduce speed but, in general, a gear cannot drive a worm to increase it. As the speed is reduced the torque to the drive increases correspondingly. Worm gears are a compact, efficient means of substantially decreasing speed and increasing torque. Wormgears operate under high sliding velocity and moderate loads. The sliding action produces friction that produces higher operating temperatures than those that occur in other gear drives. Lubricants for wormgears are often formulated with base oils that have high viscosity indexes and low traction coefficients to resist the thinning due to high temperatures and reduce frictional energy loss.

It has been shown by L. A. Bronshteyn and J. H. Kreiner, "Energy Efficiency of Industrial Oils," STLE paper 99-AM-2, (1999), that the property most relevant to wormgear energy efficiency is the traction coefficient of the finished lubricant used in the wormgear. The percent energy efficiency of any wormgear drive [i.e. where the worm drives the wheel] has been shown to be a function of the system's friction coefficient and worm geometry according to the following relationship [Dudley's Gear Handbook, $2^{nd}$ Edition, D. P. Townsend, ed., McGraw Hill, Inc., (1992), p12.11]:

Energy Efficiency=100*[cos $\phi$-$f$ tan $\lambda$]/[cos $\phi$+tan $\lambda$]

where $\phi$=normal pressure angle
$\lambda$=pinion lead angle
f=coefficient of friction.

Previous studies by W. R. Murphy et. al., "The Effect of Lubricant Traction on Wormgear Efficiency," AGMA P254.33 (1981), have shown that the overall frictional characteristics for many commercial wormgear systems are virtually identical to the traction coefficients of the lubricants used in those systems. Therefore, it is possible to estimate the potential energy efficiencies of different lubricant formulations by substituting the traction coefficient for the friction coefficient in the above equation. This provides a good measure of energy efficiency since other lubricant properties such as viscosity, viscosity modifier type and content, and friction modifier content have been shown to exert only a relatively minor influence on the energy efficiency of commercial wormgear drives.

Wormgears by their very nature, transfer power to their mating wormwheels under essentially pure sliding conditions. The frictional heat that is generated by this movement manifests itself as a loss of power transmission efficiency [horsepower loss] and leads to a rise in temperature of oil in the oil reservoir, or bulk oil. In non-thermostatted units, the greater the efficiency transfer characteristics of the lubricant, the lower the equilibrium oil temperature observed. As a result, the potential energy savings of any lubricant in a wormgear drive application should be directly related to its power efficiency at the equilibrium oil temperature of the oil in the reservoir.

In the past, finished lubricant formulators have selected base oils and additives to improve the traction coefficient of the finished lubricant made from them. Examples of additives, referred to as friction modifiers, used to improve the traction coefficients of finished fractions have been taught in EP0973854, U.S. Pat. No. 4,634,543, and WO9524458. Polyalphaolefins (PAOs) are known to have lower friction and hence increased mechanical efficiency and reduced frictional heat loss across the full spectrum of mechanical loads from wormgears to traction drives, and do so over a wider range of operating conditions than mineral oil lubricants. Certain preferred polyalphaolefins with low friction coefficients are taught in U.S. Pat. No. 4,827,064. Often 3 to 10 percent fatty or synthetic fatty oils are added to wormgear oils to reduce friction.

A presentation by C. L. Bullock, "Innovations in Synthetic Lubricant Basestocks,' ICIS-LOR World Base Oil Conference (2004) demonstrated that blends of lower-traction coefficient PAOs (SpectraSyn Ultra™) with Group I and Group II formulations provided 20–30% wear reduction in heavy duty engines. Similar benefits that might be achieved using lower-traction coefficient Fischer-Tropsch distillate fractions in place of PAOs were not taught or anticipated by this presentation. An ExxonMobil Chemical presentation titled "SpectraSyn Ultra™—The Ultra Performance PAO," copyright 2003, demonstrated improved wormgear efficiency with lower-traction coefficient PAOs with kinematic viscosities between about 150 and 1,000 cSt at 100 degrees C. The SpectraSyn Ultra™ base oils also had high film thicknesses.

U.S. patent application Ser. No. 10/301,391 teaches blending of Fischer-Tropsch derived distillate fractions with kinematic viscosities of about 2 but less than 3 cSt at 100 degrees C. with petroleum derived base oils to produce a base oil blend with desirable low volatility and a viscosity of about 3 or greater. Benefits relating to reduced traction coefficients were not taught. It did not teach that wormgear lubricants with kinematic viscosities between ISO 68 and ISO 680 could be blended with the blended base oils of the invention.

U.S. patent application Ser. No. 10/704,031 teaches blending of an isomerized Fischer-Tropsch derived bottoms fraction with either a conventional petroleum-derived base oil or a Fischer-Tropsch derived base oil to reduce the pour point of the blend. This application does not teach that there is any benefit for friction reduction.

What we have discovered are methods of operating wormgear drives at higher energy efficiency than what was previously possible with finished lubricants made from petroleum derived lubricating base oils and/or conventional polyalphaolefins. What we also have found is a process to reduce the traction coefficients of higher-traction coefficient lubricating base oils to make them more suitable for use in a wormgear drive by blending them with isomerized Fischer-Tropsch distillate fractions having very low traction coefficients. In addition, we have discovered a new composition of wormgear lubricant that provides superior energy efficiency.

SUMMARY OF THE INVENTION

The present invention is directed to a method of operating a wormgear drive at high energy efficiency by filling an oil reservoir with a wormgear lubricant comprising an isomerized Fischer-Tropsch derived distillate fraction having a low traction coefficient, and operating the wormgear drive having the filled oil reservoir at an equilibrium oil temperature in the oil reservoir between 20 and 225 degrees C.

The present invention is also directed to a process for reducing the traction coefficient of a higher-traction coefficient lubricating base oil, by recovering a lower-traction coefficient isomerized Fischer-Tropsch derived distillate fraction having a traction coefficient less than 0.023 when measured at a kinematic viscosity of 15 cSt and a slide to roll ratio of 40 percent, and blending the lower-traction coefficient isomerized Fischer-Tropsch derived distillate fraction with the higher-traction coefficient lubricating base oil in the proper proportion to produce a lubricating base oil blend having a traction coefficient less than the traction coefficient of the higher-traction coefficient lubricating base oil when measured at a kinematic viscosity of 15 cSt.

The present invention is also directed to a wormgear lubricant comprising a) an isomerized Fischer-Tropsch derived distillate fraction having a traction coefficient less than 0.023, when measured at 15 cSt kinematic viscosity and at a slide to roll ratio of 40 percent, and b) between 2 and 50 weight percent thickener.

DETAILED DESCRIPTION OF THE INVENTION

Figure 1:
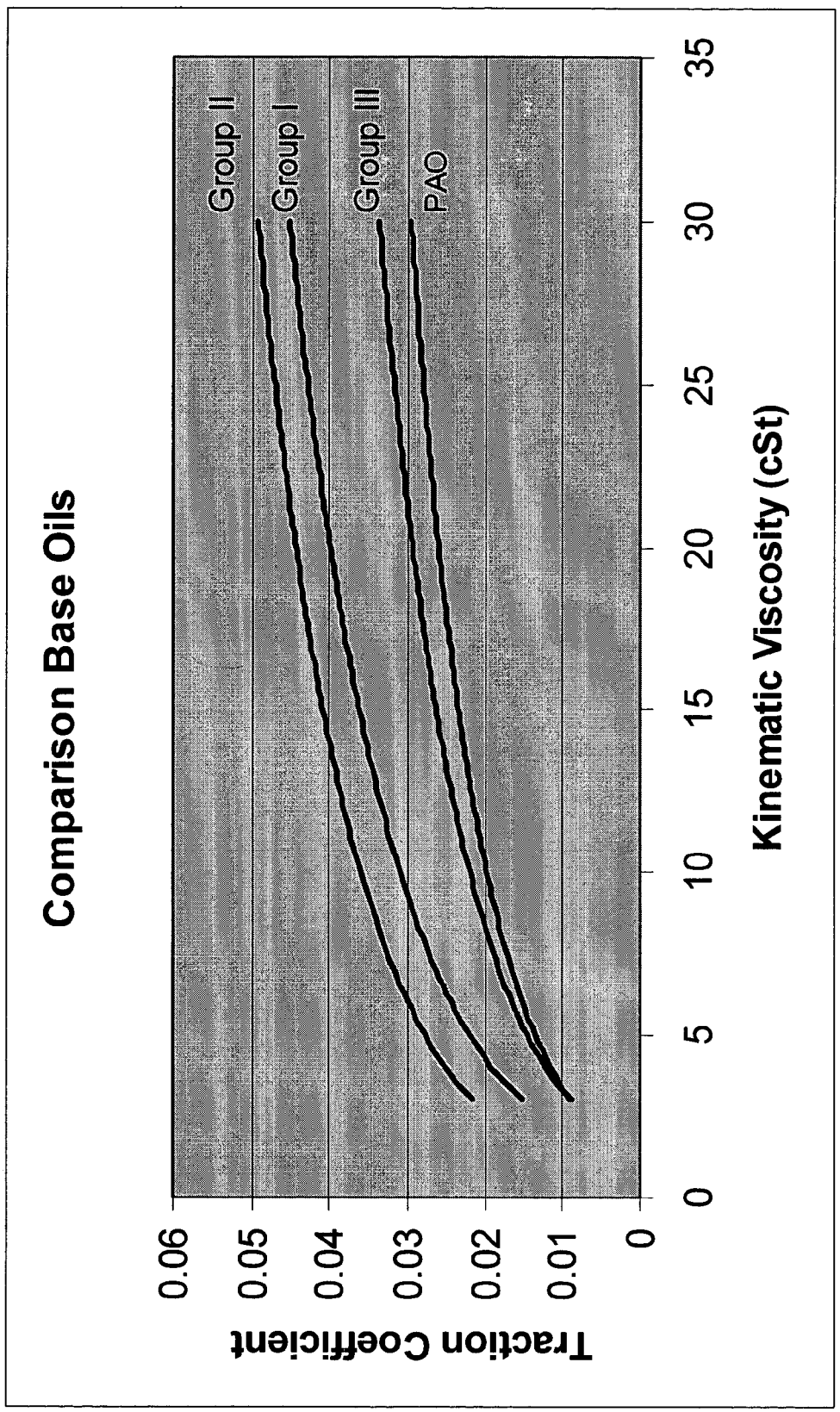
FIG. 1 illustrates the plots of Kinematic Viscosity in cSt vs. Traction Coefficient for four types of comparative base oils, including petroleum derived Group II base oils, petroleum derived Group I base oils, petroleum derived Group III base oils, and polyalphaolefin base oils. Each oil's traction coefficient data was plotted against its respective kinematic viscosity data at each test temperature (40° C., 70° C., 100° C., and 120° C.). Lines fitting the data were plotted for each comparison base oil type, and are shown in the figure.

The traction coefficient is the dimensionless ratio of the friction force F and the normal force N, where friction is the mechanical force which resists movement or hinders movement between sliding or rolling surfaces. The traction coefficient is an indicator of intrinsic lubricant properties. Lubricating base oils and finished fractions are desired having low traction coefficients as low traction coefficients are associated with energy savings, reduced equipment wear, and longer lubricant life, especially in wormgear drives.

Traction Coefficient:

Oil solidifies, or thickens, under the high pressure generated in elastohydrodynamic (EHD) lubrication regimes. The energy losses due to friction in an EHD contact is governed by the shear strength of the thickened oil. There are significant differences in solidification pressure and shear strength amounts in different types of lubricating base oils, and therefore differences in their tractional properties.

Conventional Group I base oils that have lower amounts of paraffins have relatively stiff, compact molecules that generate high traction, whereas base oils with increasing amounts of paraffins and polyalphaolefin base oils have open, elastic molecules and low traction coefficients. Traction is a sensitive measure of the interfacial conditions within the lubricated contact. Traction coefficient is a function of the shear strength of the lubricating base oil within the contact, and the shear strength of surface films, assuming there is little or no direct asperity-asperity interaction. Low traction coefficients under full-film EHD conditions are desired to prevent micropitting of gear teeth, minimize heat buildup, provide resistance to oxidative breakdown, and provide better fuel economy.

Traction Coefficient Test Method:

Traction data were obtained with an MTM Traction Measurement System from PCS Instruments, Ltd. The unit was configured with a polished 19 mm diameter ball (SAE AISI 52100 steel) angled at 220 to a flat 46 mm diameter polished disk (SAE AISI 52100 steel). Measurements were made at 40° C., 70° C., 100° C., and 120° C. The steel ball and disk were driven independently by two motors at an average rolling speed of 3 Meters/sec and a slide to roll ratio of 40% [defined as the difference in sliding speed between the ball and disk divided by the mean speed of the ball and disk. SRR=(Speed1$-$Speed2)/((Speed1+Speed2)/2)]. The load on the ball/disk was 20 Newton resulting in an estimated average contact stress of 0.546 GPa and a maximum contact stress of 0.819 GPa.

Each oil's traction coefficient data was plotted against its respective kinematic viscosity data at each test temperature (40° C., 70° C., 100° C., and 120° C.). That is, an oil's 40° C. kinematic viscosity [x coordinate] was paired with its 40° C. traction data [y coordinate], etc. Since kinematic viscosity information was generally only available at 40° C. and 100° C., the 70° C. and 120° C. kinematic viscosities were estimated from the 40° C. and 100° C. data using the well known Walther Equation [$\mathrm{Log}10(\mathrm{Log}10(\mathrm{vis}+0.6))=a-c \times \mathrm{Log}10(\mathrm{Temp}, \mathrm{degs} \ \mathrm{K})$]. The Walther Equation is the most widely used equation for estimating viscosities at odd temperatures and forms the basis for the ASTM D341 viscosity-temperature charts. Results for each oil were reported on a linear fit of the log traction coefficient data versus kinematic viscosity in cSt. The traction coefficient result for each oil at 15 cSt kinematic viscosity, and other kinematic viscosities, were read off of the plots and tabulated.

A discussion regarding the traction properties of different types of 4 cSt base oils is included in Quereshi, F. S., et. al., (May 2003), "Developing Next Generation Axle Fluids: Rheological Considerations," Lubrication Engineering Journal of the Society of Tribologists and Lubrication Engineers. When tested according to the method described above, petroleum derived Group II base oils have higher traction coefficients than petroleum derived Group I base oils; petroleum derived Group I base oils have higher traction coefficients than petroleum derived Group III base oils; and petroleum derived Group III base oils have higher traction coefficients than polyalphaolefin (PAO) base oils. Prior to this invention, the base oils with the lowest traction coefficients known were PAOs.

Figure 2:
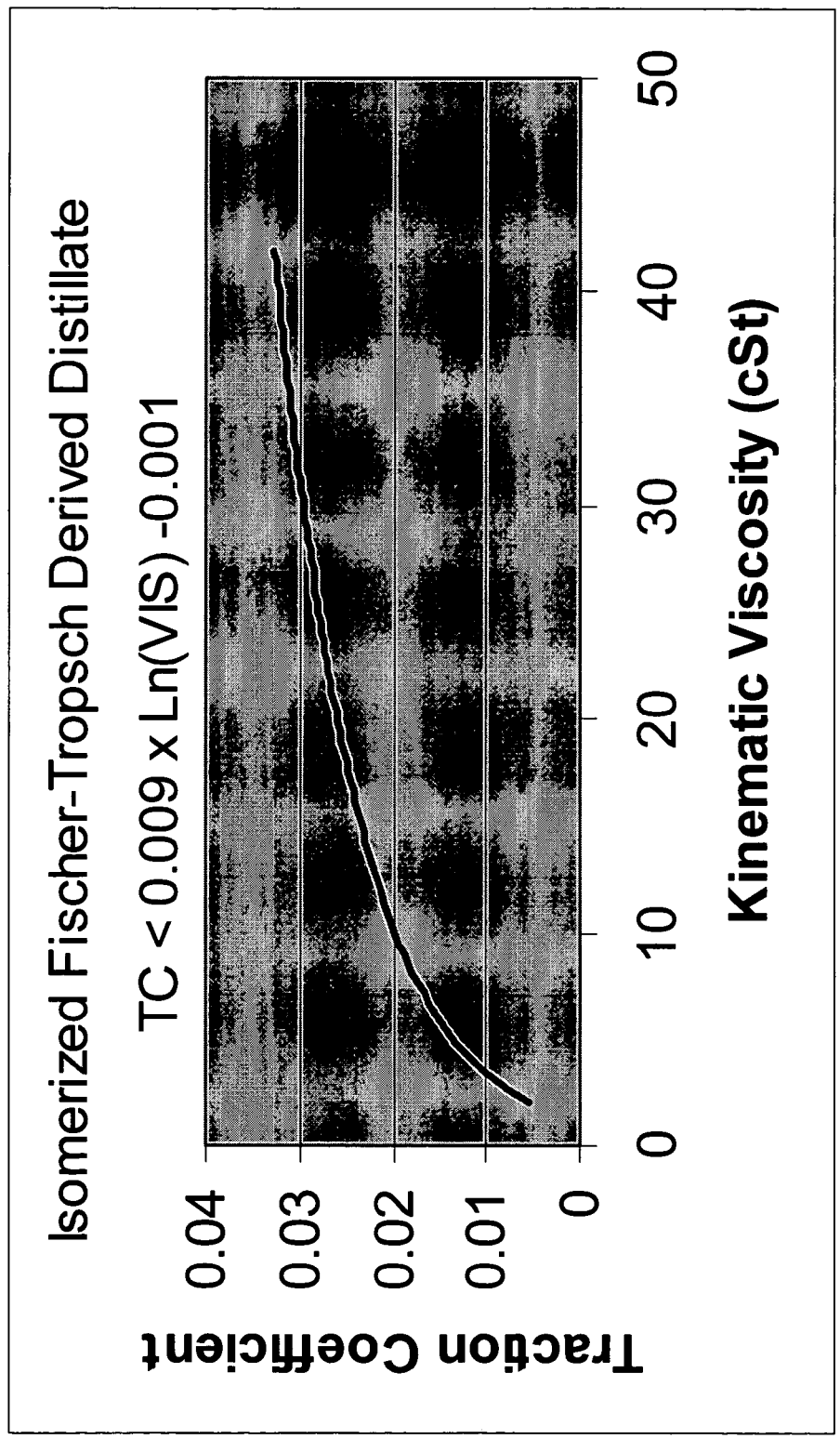
FIG. 2 illustrates the line for which the traction coefficients of the isomerized Fischer-Tropsch derived distillate fractions of this invention fall below. The line is defined by the equation: Traction Coefficient=$0.009 \times \mathrm{Ln}$(Kinematic Viscosity in cSt)$-0.001$, wherein the Kinematic Viscosity during the traction coefficient measurement is between 2 and 50 cSt, and Ln refers to natural logarithm with base "e".

The isomerized Fischer-Tropsch derived distillate fractions of this invention have traction coefficients less than conventional PAOs. As used in this disclosure, the term "conventional PAOs" refers to PAOs with kinematic viscosities less than about 150 cSt at 100 degrees C. The isomerized Fischer-Tropsch derived distillate fractions of this invention have traction coefficients less than 0.023 when measured at 15 cSt kinematic viscosity. Preferably they will have a traction coefficient less than the equation for traction coefficients of conventional PAOs: Traction Coefficient=$0.009 \times Ln$(Kinematic Viscosity in cSt)$-0.001$, wherein the Kinematic Viscosity in cSt is the viscosity of the oil during the measurement of the traction coefficient. Ln refers to the natural logarithm with base "e." The Kinematic Viscosity in cSt will vary depending on the test temperature and the viscosity index of the oil being tested. The Kinematic Viscosity range of the base oils used in the equation is between 2 and 50 cSt. A plot of this equation is shown in FIG. 2.

Equilibrium Oil Temperature:

The temperature of the oil in the oil reservoir of a gearbox, in operation, will increase until the heat balance of the internally generated heat plus the external imposed heat reaches an equilibrium with the dissipated heat. Sources of internal heat generation are the power losses in the gearbox due to friction between the components in relative motion. In worm gearboxes the gear friction is the dominating source for heat generation due to the high sliding friction in the gear mesh. Worm gearboxes are less efficient than other types of gears and often have a "thermally limited power rating."

External heat can be imposed by radiation such as direct sun exposure or absorption of the high ambient temperature or other means. The heat is normally dissipated by radiation through the gearbox housing surfaces and through convection to the surrounding air, surrounding structures and components. In cases where the ambient conditions do not support an adequate cooling (heat dissipation), additional external means are necessary such as a fan, special oil cooler, etc. The equilibrium oil temperature in the oil reservoir of a worm gear box is generally between 20 degrees C. and 225 degrees C. Preferably the equilibrium temperature will be between 20 degrees C. and 150 degrees C. Because Fischer-Tropsch derived lubricating base oils have high oxidation stability they may be operated in wormgears for long periods even under high equilibrium oil temperature.

Isomerized Fischer-Tropsch Derived Distillate Fraction:

The isomerized Fischer-Tropsch derived distillate fraction which has a low traction coefficient is separated from the hydrocarbons produced during hydroisomerizing and optional hydrofinishing of a Fischer-Tropsch synthesis reaction product.

Fischer-Tropsch Synthesis

In Fischer Tropsch chemistry, syngas is converted to liquid hydrocarbons by contact with a Fischer Tropsch catalyst under reactive conditions. Typically, methane and optionally heavier hydrocarbons (ethane and heavier) can be sent through a conventional syngas generator to provide synthesis gas. Generally, synthesis gas contains hydrogen and carbon monoxide, and may include minor amounts of carbon dioxide and/or water. The presence of sulfur, nitrogen, halogen, selenium, phosphorus and arsenic contaminants in the syngas is undesirable. For this reason and depending on the quality of the syngas, it is preferred to remove sulfur and other contaminants from the feed before performing the Fischer-Tropsch chemistry. Means for removing these contaminants are well known to those of skill in the art. For example, ZnO guard beds are preferred for removing sulfur impurities. Means for removing other contaminants are well known to those of skill in the art. It also may be desirable to purify the syngas prior to the Fischer-Tropsch reactor to remove carbon dioxide produced during the syngas reaction and any additional sulfur compounds not already removed. This can be accomplished, for example, by contacting the syngas with a mildly alkaline solution (e.g., aqueous potassium carbonate) in a packed column.

In the Fischer-Tropsch process, contacting a synthesis gas comprising a mixture of H2 and CO with a Fischer-Tropsch catalyst under suitable temperature and pressure reactive conditions forms liquid and gaseous hydrocarbons. The Fischer-Tropsch reaction is typically conducted at temperatures of about 300–700° F. (149–371° C.), preferably about 400–550° F. (204–228° C.); pressures of about 10–600 psia, (0.7–41 bars), preferably about 30–300 psia, (2–21 bars); and catalyst space velocities of about 100–10,000 cc/g/hr, preferably about 300–3,000 cc/g/hr. Examples of conditions for performing Fischer Tropsch type reactions are well known to those of skill in the art.

The fractions of the Fischer-Tropsch synthesis process may range from C1 to C200+0 with a majority in the C5 to C100+range. The reaction can be conducted in a variety of reactor types, such as fixed bed reactors containing one or more catalyst beds, slurry reactors, fluidized bed reactors, or a combination of different type reactors. Such reaction processes and reactors are well known and documented in the literature.

The slurry Fischer-Tropsch process, which is preferred in the practice of the invention, utilizes superior heat (and mass) transfer characteristics for the strongly exothermic synthesis reaction and is able to produce relatively high molecular weight, paraffinic hydrocarbons when using a cobalt catalyst. In the slurry process, a syngas comprising a mixture of hydrogen and carbon monoxide is bubbled up as a third phase through a slurry which comprises a particulate Fischer-Tropsch type hydrocarbon synthesis catalyst dispersed and suspended in a slurry liquid comprising hydrocarbon fractions of the synthesis reaction which are liquid under the reaction conditions. The mole ratio of the hydrogen to the carbon monoxide may broadly range from about 0.5 to about 4, but is more typically within the range of from about 0.7 to about 2.75 and preferably from about 0.7 to about 2.5. A particularly preferred Fischer-Tropsch process is taught in EP0609079, also completely incorporated herein by reference for all purposes.

In general, Fischer Tropsch catalysts contain a Group VIII transition metal on a metal oxide support. The catalysts may also contain a noble metal promoter(s) and/or crystalline molecular sieves. Suitable Fischer-Tropsch catalysts comprise one or more of Fe, Ni, Co, Ru and Re, with cobalt being preferred. A preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as ThO2, La2O3, MgO, and TiO2, promoters such as ZrO2, noble metals (Pt, Pd, Ru, Rh, Os, Ir), coinage metals (Cu, Ag, Au), and other transition metals such as Fe, Mn, Ni, and Re. Suitable support materials include alumina, silica, magnesia and titania or mixtures thereof. Preferred supports for cobalt containing catalysts comprise titania. Useful catalysts and their preparation are known and illustrated in U.S. Pat. No. 4,568,663, which is intended to be illustrative but non-limiting relative to catalyst selection.

Certain catalysts are known to provide chain growth probabilities that are relatively low to moderate, and the reaction fractions include a relatively high proportion of low molecular (C2–C8) weight olefins and a relatively low proportion of high molecular weight (C30+) waxes. Certain other catalysts are known to provide relatively high chain growth probabilities, and the reaction fractions include a relatively low proportion of low molecular (C2–C8) weight olefins and a relatively high proportion of high molecular weight (C30+) waxes. Such catalysts are well known to those of skill in the art and can be readily obtained and/or prepared. A particularly preferred Fischer-Tropsch process is taught in EP0609079. Examples of processes producing waxes of higher carbon number distribution are taught in WO199934917A1.

The fraction from a Fischer-Tropsch process contains predominantly paraffins. The fractions from Fischer-Tropsch reactions generally include a light reaction fraction and a waxy reaction fraction. The light reaction fraction (i.e., the condensate fraction) includes hydrocarbons boiling below about 700° F. (e.g., tail gases through middle distillate fuels), largely in the C5–C20 range, with decreasing amounts up to about C30. The waxy reaction fraction (i.e., the wax fraction) includes hydrocarbons boiling above about 600° F. (e.g., vacuum gas oil through heavy paraffins), largely in the C20+0 range, with decreasing amounts down to C10.

Both the light reaction fraction and the waxy fraction are substantially paraffinic. The waxy fraction generally comprises greater than 70 weight % normal paraffins, and often greater than 80 weight % normal paraffins. The light reaction fraction comprises paraffinic fractions with a significant proportion of alcohols and olefins. In some cases, the light reaction fraction may comprise as much as 50 weight %, and even higher, alcohols and olefins. It is the waxy reaction fraction (i.e., the wax fraction) that is used as a feedstock to the process for providing the Fischer-Tropsch derived lubricating base oil used in the blended lubricants and blended finished lubricants of the present invention.

The isomerized Fischer-Tropsch distillate fractions with low traction coefficients are prepared from the waxy fractions of the Fischer-Tropsch syncrude by a process including hydroisomerization. Preferably, the Fischer-Tropsch lubricant base oils are made by a process as described in U.S. Ser. No. 10/744,389, filed Dec. 23, 2003, and U.S. Ser. No. 10/744,870, filed Dec. 23, 2003, herein incorporated by reference in their entirety. The isomerized Fischer-Tropsch distillate fractions used in the blended lubricating base oils and blended finished lubricants of the present invention may be manufactured at a site different from the site at which the components of the blended lubricant are received and blended.

Hydroisomerization

Hydroisomerization is intended to improve the cold flow properties of the lubricating base oil by the selective addition of branching into the molecular structure. Hydroisomerization ideally will achieve high conversion levels of the Fischer-Tropsch wax to non-waxy iso-paraffins while at the same time minimizing the conversion by cracking. Preferably, the conditions for hydroisomerization in the present invention are controlled such that the conversion of the compounds boiling above about 700° F. in the wax feed to compounds boiling below about 700° F. is maintained between about 10 wt % and 50 wt %, preferably between 15 wt % and 45 wt %.

According to the present invention, hydroisomerization is conducted using a shape selective intermediate pore size molecular sieve. Hydroisomerization catalysts useful in the present invention comprise a shape selective intermediate pore size molecular sieve and optionally a catalytically active metal hydrogenation component on a refractory oxide support. The phrase "intermediate pore size," as used herein means an effective pore aperture in the range of from about 3.9 to about 7.1 Å when the porous inorganic oxide is in the calcined form. The shape selective intermediate pore size molecular sieves used in the practice of the present invention are generally 1-D 10-, 11- or 12-ring molecular sieves. The preferred molecular sieves of the invention are of the 1-D 10-ring variety, where 10-(or 11- or 12-) ring molecular sieves have 10 (or 11 or 12) tetrahedrally-coordinated atoms (T-atoms) joined by oxygen. In the 1-D molecular sieve, the 10-ring (or larger) pores are parallel with each other, and do not interconnect. Note, however, that 1-D 10-ring molecular sieves which meet the broader definition of the intermediate pore size molecular sieve but include intersecting pores having 8-membered rings may also be encompassed within the definition of the molecular sieve of the present invention. The classification of intrazeolite channels as 1-D, 2-D and 3-D is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75).

Preferred shape selective intermediate pore size molecular sieves used for hydroisomerization are based upon aluminum phosphates, such as SAPO-11, SAPO-31, and SAPO-41. SAPO-11 and SAPO-31 are more preferred, with SAPO-11 being most preferred. SM-3 is a particularly preferred shape selective intermediate pore size SAPO, which has a crystalline structure falling within that of the SAPO-11 molecular sieves. The preparation of SM-3 and its unique characteristics are described in U.S. Pat. Nos. 4,943,424 and 5,158,665. Also preferred shape selective intermediate pore size molecular sieves used for hydroisomerization are zeolites, such as ZSM-22, ZSM-23, ZSM-35, ZSM-48, ZSM-57, SSZ-32, offretite, and ferrierite. Of these zeolites, SSZ-32 and ZSM-23 are more preferred.

A preferred intermediate pore size molecular sieve is characterized by selected crystallographic free diameters of the channels, selected crystallite size (corresponding to selected channel length), and selected acidity. Desirable crystallographic free diameters of the channels of the molecular sieves are in the range of from about 3.9 to about 7.1 Angstrom, having a maximum crystallographic free diameter of not more than 7.1 and a minimum crystallographic free diameter of not less than 3.9 Angstrom. Preferably the maximum crystallographic free diameter is not more than 7.1 and the minimum crystallographic free diameter is not less than 4.0 Angstrom. Most preferably the maximum crystallographic free diameter is not more than 6.5 and the minimum crystallographic free diameter is not less than 4.0 Angstrom. The crystallographic free diameters of the channels of molecular sieves are published in the "Atlas of Zeolite Framework Types", Fifth Revised Edition, 2001, by Ch. Baerlocher, W. M. Meier, and D. H. Olson, Elsevier, pp 10–15, which is incorporated herein by reference.

A particularly preferred intermediate pore size molecular sieve, which is useful in the present process is described, for example, in U.S. Pat. Nos. 5,135,638 and 5,282,958, the contents of which are hereby incorporated by reference in their entirety. In U.S. Pat. No. 5,282,958, such an intermediate pore size molecular sieve has a crystallite size of no more than about 0.5 microns and pores with a minimum diameter of at least about 4.8 Å and with a maximum diameter of about 7.1 Å. The catalyst has sufficient acidity so that 0.5 grams thereof when positioned in a tube reactor converts at least 50% of hexadecane at 370° C., a pressure of 1200 psig, a hydrogen flow of 160 ml/min, and a feed rate of 1 ml/hr. The catalyst also exhibits isomerization selectivity of 40 percent or greater (isomerization selectivity is determined as follows: 100×(weight % branched C16 in fraction)/(weight % branched C16 in fraction+weight % C13− in fraction) when used under conditions leading to 96% conversion of normal hexadecane (n-C16) to other species.

If the crystallographic free diameters of the channels of a molecular sieve are unknown, the effective pore size of the molecular sieve can be measured using standard adsorption techniques and hydrocarbonaceous compounds of known minimum kinetic diameters. See Breck, Zeolite Molecular Sieves, 1974 (especially Chapter 8); Anderson et al. J. Catalysis 58, 114 (1979); and U.S. Pat. No. 4,440,871, the pertinent portions of which are incorporated herein by reference. In performing adsorption measurements to determine pore size, standard techniques are used. It is convenient to consider a particular molecule as excluded if does not reach at least 95% of its equilibrium adsorption value on the molecular sieve in less than about 10 minutes (p/po=0.5 at 25° C.). Intermediate pore size molecular sieves will typically admit molecules having kinetic diameters of 5.3 to 6.5 Angstrom with little hindrance.

Hydroisomerization catalysts useful in the present invention comprise a catalytically active hydrogenation metal. The presence of a catalytically active hydrogenation metal leads to fraction improvement, especially VI and stability. Typical catalytically active hydrogenation metals include chromium, molybdenum, nickel, vanadium, cobalt, tungsten, zinc, platinum, and palladium. The metals platinum and palladium are especially preferred, with platinum most especially preferred. If platinum and/or palladium is used, the total amount of active hydrogenation metal is typically in the range of 0.1 to 5 weight percent of the total catalyst, usually from 0.1 to 2 weight percent, and not to exceed 10 weight percent.

The refractory oxide support may be selected from those oxide supports, which are conventionally used for catalysts, including silica, alumina, silica-alumina, magnesia, titania and combinations thereof.

The conditions for hydroisomerization will be tailored to achieve an isomerized Fischer-Tropsch derived distillate fraction comprising a weight percent of molecules with cycloparaffin functionality greater than 3 and a ratio of weight percent of molecules with monocycloparaffin functionality to weight percent of molecules with multicycloparaffin functionality greater than 15. The conditions for hydroisomerization will depend on the properties of feed used, the catalyst used, whether or not the catalyst is sulfided, the desired yield, and the desired properties of the lubricant base oil. Conditions under which the hydroisomerization process of the current invention may be carried out include temperatures from about 550° F. to about 750° F. (287° C. to about 399° C.), preferably about 600° F. to about 700° F. (315° C. to about 371° C.); and pressures from about 15 to 3000 psig, preferably 100 to 2500 psig. The hydroisomerization dewaxing pressures in this context refer to the hydrogen partial pressure within the hydroisomerization reactor, although the hydrogen partial pressure is substantially the same (or nearly the same) as the total pressure. The liquid hourly space velocity during contacting is generally from about 0.1 to 20 hr-1, preferably from about 0.1 to about 5 hr-1. The hydrogen to hydrocarbon ratio falls within a range from about 1.0 to about 50 moles H2 per mole hydrocarbon, more preferably from about 10 to about 20 moles H2 per mole hydrocarbon. Suitable conditions for performing hydroisomerization are described in U.S. Pat. Nos. 5,282,958 and 5,135,638, the contents of which are incorporated by reference in their entirety.

Hydrogen is present in the reaction zone during the hydroisomerization process, typically in a hydrogen to feed ratio from about 0.5 to 30 MSCF/bbl (thousand standard cubic feet per barrel), preferably from about 1 to about 10 MSCF/bbl. Hydrogen may be separated from the fraction and recycled to the reaction zone.

Hydrotreating

Waxy feed to the hydroisomerization process may be hydrotreated prior to hydroisomerization dewaxing. Hydrotreating refers to a catalytic process, usually carried out in the presence of free hydrogen, in which the primary purpose is the removal of various metal contaminants, such as arsenic, aluminum, and cobalt; heteroatoms, such as sulfur and nitrogen; oxygenates; or aromatics from the feed stock. Generally, in hydrotreating operations cracking of the hydrocarbon molecules, i.e., breaking the larger hydrocarbon molecules into smaller hydrocarbon molecules, is minimized, and the unsaturated hydrocarbons are either fully or partially hydrogenated.

Catalysts used in carrying out hydrotreating operations are well known in the art. See, for example, U.S. Pat. Nos. 4,347,121 and 4,810,357, the contents of which are hereby incorporated by reference in their entirety, for general descriptions of hydrotreating, hydrocracking, and of typical catalysts used in each of the processes. Suitable catalysts include noble metals from Group VIIIA (according to the 1975 rules of the International Union of Pure and Applied Chemistry), such as platinum or palladium on an alumina or siliceous matrix, and Group VIII and Group VIB, such as nickel-molybdenum or nickel-tin on an alumina or siliceous matrix. U.S. Pat. No. 3,852,207 describes a suitable noble metal catalyst and mild conditions. Other suitable catalysts are described, for example, in U.S. Pat. Nos. 4,157,294 and 3,904,513. The non-noble hydrogenation metals, such as nickel-molybdenum, are usually present in the final catalyst composition as oxides, but are usually employed in their reduced or sulfided forms when such sulfide compounds are readily formed from the particular metal involved.

Preferred non-noble metal catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. Catalysts containing noble metals, such as platinum, contain in excess of 0.01 percent metal, preferably between 0.1 and 1.0 percent metal. Combinations of noble metals may also be used, such as mixtures of platinum and palladium.

Typical hydrotreating conditions vary over a wide range. In general, the overall LHSV is about 0.25 to 2.0, preferably about 0.5 to 1.5. The hydrogen partial pressure is greater than 200 psia, preferably ranging from about 500 psia to about 2000 psia. Hydrogen recirculation rates are typically greater than 50 SCF/Bbl, and are preferably between 1000 and 5000 SCF/Bbl. Temperatures in the reactor will range from about 300° F. to about 750° F. (about 149° C. to about 399° C.), preferably ranging from 450° F. to 725° F. (230° C. to 385° C.).

Hydrofinishing

Hydrofinishing is a hydrotreating process that may be used as a step following hydroisomerization to provide the Fischer-Tropsch lubricating base oil. Hydrofinishing is intended to improve oxidation stability, UV stability, and appearance of the Fischer-Tropsch lubricating base oil fraction by removing traces of aromatics, olefins, color bodies, and solvents. As used in this disclosure, the term UV stability refers to the stability of the lubricating base oil or the finished lubricant when exposed to UV light and oxygen. UV instability is indicated when a visible precipitate forms, usually seen as floccules or cloudiness, or a darker color develops upon exposure to ultraviolet light and air. A general description of hydrofinishing may be found in U.S. Pat. Nos. 3,852,207 and 4,673,487.

The conditions for hydrofinishing will be tailored to achieve an isomerized Fischer-Tropsch derived distillate fraction comprising a weight percent aromatics less than 0.30 (preferably less than 0.10, more preferably less than 0.05), a weight percent of molecules with cycloparaffin functionality greater than 3, and a ratio of weight percent of molecules with monocycloparaffin functionality to weight percent of molecules with multicycloparaffin functionality greater than 15. More than one hydrofinishing step may be needed to achieve these results.

During hydrofinishing, overall liquid hourly space velocity (LHSV) is about 0.25 to 2.0 hr-1, preferably about 0.5 to 1.0 hr-1. The hydrogen partial pressure is greater than 200 psia, preferably ranging from about 500 psia to about 2000 psia. Hydrogen recirculation rates are typically greater than 50 SCF/Bbl, and are preferably between 1000 and 5000 SCF/Bbl. Temperatures range from about 300° F. to about 750° F. (about 149° C. to about 399° C.), preferably ranging from 450° F. to 600° F. (232° C. to 316° C.).

Suitable hydrofinishing catalysts include noble metals from Group VIIIA (according to the 1975 rules of the International Union of Pure and Applied Chemistry), such as platinum or palladium on an alumina or siliceous matrix, and unsulfided Group VIIIA and Group VIB, such as nickel-molybdenum or nickel-tin on an alumina or siliceous matrix. U.S. Pat. No. 3,852,207 describes a suitable noble metal catalyst and mild conditions. Other suitable catalysts are described, for example, in U.S. Pat. Nos. 4,157,294 and 3,904,513. The non-noble metal (such as nickel-molybdenum and/or tungsten, and at least about 0.5, and generally about 1 to about 15 weight percent of nickel and/or cobalt determined as the corresponding oxides. The noble metal (such as platinum) catalyst contains in excess of 0.01 percent metal, preferably between 0.1 and 1.0 percent metal. Combinations of noble metals may also be used, such as mixtures of platinum and palladium.

Clay treating to remove impurities is an alternative final process step to provide an isomerized Fischer-Tropsch derived distillate fraction having a low traction coefficient.

Fractionation

The separation of Fischer-Tropsch derived fractions and petroleum derived fractions into various fractions having characteristic boiling ranges is generally accomplished by either atmospheric or vacuum distillation or by a combination of atmospheric and vacuum distillation. As used in this disclosure, the term "distillate fraction" or "distillate" refers to a side stream fraction recovered either from an atmospheric fractionation column or from a vacuum column as opposed to the "bottoms" which represents the residual higher boiling fraction recovered from the bottom of the column. Atmospheric distillation is typically used to separate the lighter distillate fractions, such as naphtha and middle distillates, from a bottoms fraction having an initial boiling point above about 600° F. to about 750° F. (about 315° C. to about 399° C.). At higher temperatures thermal cracking of the hydrocarbons may take place leading to fouling of the equipment and to lower yields of the heavier cuts. Vacuum distillation is typically used to separate the higher boiling material, such as the lubricating base oil fractions, into different boiling range cuts. Fractionating the lubricating base oil into different boiling range cuts enables the lubricating base oil manufacturing plant to produce more than one grade, or viscosity, of lubricating base oil.

The isomerized Fischer-Tropsch derived distillate fractions of this invention make excellent lubricating base oils. The isomerized Fischer-Tropsch derived distillate fractions used in carrying out the invention are characterized by having a low traction coefficient, a weight percent aromatics less than 0.30, a weight percent of molecules with cycloparaffin functionality greater than 3, a ratio of weight percent of molecules with monocycloparaffin functionality to weight percent of molecules with multicycloparaffin functionality greater than 15, and a kinematic viscosity at 100 degrees C. greater than 2 and less than 30 cSt.

Solvent Dewaxing

The process to make an isomerized Fischer-Tropsch derived distillate fraction having a low traction coefficient may also include a solvent dewaxing step following the hydroisomerization process. Solvent dewaxing optionally may be used to remove small amounts of remaining waxy molecules from the lubricating base oil after hydroisomerization dewaxing. Solvent dewaxing is done by dissolving the lubricating base oil in a solvent, such as methyl ethyl ketone, methyl iso-butyl ketone, or toluene, and precipitating the wax molecules as discussed in Chemical Technology of Petroleum, 3rd Edition, William Gruse and Donald Stevens, McGraw-Hill Book Company, Inc., New York, 1960, pages 566 to 570. Solvent dewaxing is also described in U.S. Pat. Nos. 4,477,333, 3,773,650 and 3,775,288. A preferred method for solvent dewaxing to achieve especially high VI and low pour point base oils is described in U.S. Ser. No. 10/684,554, filed Oct. 14, 2003.

Hydrocarbon Composition of Isomerized Fischer-Tropsch Derived Distillate:

The desired fractions of isomerized Fischer-Tropsch derived distillate fractions useful in this invention are selected to have the desired combination of properties, including: a weight percent of molecules with cycloparaffin functionality greater than 3, a ratio of weight percent of molecules containing monocycloparaffins to molecules containing multicycloparaffins greater than 15, and a traction coefficient less than an amount calculated by the equation: Traction Coefficient=0.009×Ln(Kinematic Viscosity in cSt)−0.001, wherein the Kinematic Viscosity during the traction coefficient measurement is between 2 and 50 cSt, and wherein the traction coefficient is measured by the test method described herein.

The isomerized Fischer-Tropsch derived distillate fractions of this invention have extremely low levels of unsaturates. Olefins are present in amounts less than detectable by long duration $C^{13}$ Nuclear Magnetic Resonance Spectroscopy (NMR). Aromatics are present in amounts less than 0.30 weight percent by HPLC-UV. In preferred embodiments the aromatics are present in amounts less than 0.10 weight percent, more preferably less than 0.05 weight percent.

The isomerized Fischer-Tropsch distillate fractions of this invention have greater than 99 wt % saturates. Traditionally, of the different saturated hydrocarbons found in mineral oils, paraffins are considered more stable than cycloparaffins towards oxidation, and therefore, more desirable. Once aromatics in the base oil are less than 1%, the most effective way to further improve oxidation stability is to increase viscosity index. As the isomerized Fischer-Tropsch distillate fractions of this invention made from substantially paraffinic wax feed have extremely low levels of aromatics, typically less than 0.30 weight percent, it has been shown that the lower the concentration of multicycloparaffins in an oil, the higher its viscosity index and also its oxidation stability.

However, when total cycloparaffins are very low in a lubricating base oil, the additive solubility is low and the elastomer compatibility is poor. Examples of base oils with these properties are polyalphaolefins and Fischer-Tropsch base oils with less than 5% cycloparaffins. To improve these properties in finished lubricants, expensive co-solvents such as esters must often be added. Isomerized Fischer-Tropsch distillate fractions of this invention with a balance of high monocycloparaffins and low multicycloparaffins have high oxidation stability in addition to good additive solubility and elastomer compatibility.

The composition of saturates (n-paraffin, iso-paraffin, and cycloparaffins) in isomerized Fischer-Tropsch distillate fractions of this invention is determined by field ionization mass spectroscopy (FIMS). FIMS spectra were obtained on a VG 70VSE mass spectrometer. The samples were introduced via a solid probe, which was heated from about 40° C. to 500° C. at a rate of 50° C. per minute. The mass spectrometer was scanned from m/z 40 to m/z 1000 at a rate of 5 seconds per decade. The acquired mass spectra were summed to generate one "averaged" spectrum. Each spectrum was $C_{13}$ corrected using a software package from PC-MassSpec. FIMS ionization efficiency was evaluated using blends of nearly pure branched paraffins and highly naphthenic, aromatics-free base stock. We confirmed that the ionization efficiencies of various classes of saturates in these base oils were not dramatically different. N-paraffins, on the other hand, did indeed show a significantly lower (~50% lower) ionization efficiency than branched paraffins or cycloparaffins. Fortunately, branched paraffins and cycloparaffins comprise more than 99.9% of the saturates in the isomerized Fischer-Tropsch distillate fractions of this invention. Oils that have not been manufactured using the process of this invention, may contain significantly higher amounts of n-paraffins; and the lower n-paraffin ionization efficiency would need to be considered in the interpretation of the FIMS analysis.

The HPLC-UV test method used to measure low level aromatics, and the FIMS test method used to characterize saturates are described in D. C. Kramer, et al., "Influence of Group II & III Base Oil Composition on VI and Oxidation Stability," presented at the 1999 AIChE Spring National Meeting in Houston, Mar. 16, 1999, the contents of which is incorporated herein in its entirety.

The isomerized Fischer-Tropsch derived distillate fractions of this invention are characterized by FIMS into paraffins and cycloparaffins containing different numbers of rings. Cycloparaffins are molecules containing at least one cycloparaffin ring. Monocycloparaffins contain one ring, dicycloparaffins contain two rings, tricycloparaffins contain three rings, tetracycloparaffins contain four rings, pentacycloparaffins contain five rings, and hexacycloparaffins contain six rings. Molecules with more than one cycloparaffin ring are referred to as multicycloparaffins in this invention. The isomerized Fischer-Tropsch derived distillate fractions of this invention have a weight percent of molecules with cycloparaffin functionality greater than 3, preferably greater than 5, more preferably greater than 10. They have a ratio of weight percent of molecules containing monocycloparaffins to weight percent of molecules containing multicycloparaffin greater than 15, preferably greater than 50. The most preferred isomerized Fischer-Tropsch derived distillate fractions of this invention have no multicycloparaffins.

As used in this disclosure, the terms "weight percent of molecules with cycloparaffin, monocycloparaffin, or multicycloparaffin functionality" refer to the weight percent of molecules containing at least one cycloparaffin function, containing at least one monocycloparaffin function, or containing at least one multicycloparaffin function, as measured by FIMS, disclosed herein.

Although the wax feeds of this invention are essentially free of olefins, base oil processing techniques can introduce olefins, especially at high temperatures, due to 'cracking' reactions. In the presence of heat or UV light, olefins can polymerize to form higher molecular weight fractions that can color the base oil or cause sediment. In general, olefins can be removed during the process of this invention by hydrofinishing or by clay treatment. As olefins may be included in the FIMS results for monocycloparaffins, we also tested for olefins to confirm that less than 3 wt % were present in the oils of our invention, and that if the olefins were subtracted that the monocycloparaffins would still be in the desired range. Olefin content was estimated by measuring the bromine index by ASTM D 2710 and then calculating the weight percent of olefins from the bromine number. The bromine number is essentially the bromine index divided by 1000. Bromine number is the number of grams of bromine that react with 100 grams of a sample of oil, giving an indication of the relative amount of olefins and diolefins in the oil. The calculation for wt % olefins that we used uses the assumptions that the olefins are present as one double bond per molecule and that one molecule of $Br_2$ reacts with each molecule containing an olefin. The isomerized Fischer-Tropsch derived distillate fractions of this invention have low bromine numbers; generally less than 0.50, preferably less than 0.30. In addition, we measured the olefin content using Proton Nuclear Magnetic Resonance ($^1H$ NMR) Spectroscopy on a few of the isomerized Fischer- Tropsch derived distillate fractions of this invention. For samples having a boiling range above 1000 degrees F., the boiling range distributions in this disclosure (referred to as SIMDIS in the examples) were measured using the standard analytical method D 6352-03 or its equivalent. For samples having a boiling range below 1000 degrees F., the boiling range distributions in this disclosure were measured using the standard analytical method D 2887-03 or its equivalent.

Branching Properties:

Preferably the isomerized Fischer-Tropsch derived distillate fractions of this invention have branching properties that contribute to the low traction coefficients and film thicknesses. That is, they preferably have a Free Carbon Index (FCI) between 2 and 12, more preferably between 3 and 10; and additionally they have less than 12 alkyl branches per 100 carbons, preferably less than 10 alkyl branches per 100 carbons.

The branching properties of the isomerized Fischer-Tropsch derived distillate fraction of the present invention were determined by analyzing a sample of oil using carbon-13 NMR according to the following eight-step process. References cited in the description of the process provide details of the process steps. Steps 1 and 2 are performed only on the initial materials from a new process.

1) Identify the CH branch centers and the $CH_3$ branch termination points using the DEPT Pulse sequence (Doddrell, D. T.; D. T. Pegg; M. R. Bendall, *Journal of Magnetic Resonance* 1982, 48, 323ff.).

2) Verify the absence of carbons initiating multiple branches (quaternary carbons) using the APT pulse sequence (Patt, S. L.; J. N. Shoolery, *Journal of Magnetic Resonance* 1982, 46, 535ff.).

3) Assign the various branch carbon resonances to specific branch positions and lengths using tabulated and calculated values (Lindeman, L. P., *Journal of Qualitative Analytical Chemistry* 43, 1971 1245ff; Netzel, D. A., et. al., *Fuel*, 60, 1981, 307ff.).

EXAMPLES

Branch NMR Chemical Shift (ppm)
2-methyl 22.5
3-methyl 19.1 or 11.4
4-methyl 14.0
4+methyl 19.6
Internal ethyl 10.8
Propyl 14.4
Adjacent methyls 16.7

4) Quantify the relative frequency of branch occurrence at different carbon positions by comparing the integrated intensity of its terminal methyl carbon to the intensity of a single carbon (=total integral/number of carbons per molecule in the mixture). For the unique case of the 2-methyl branch, where both the terminal and the branch methyl occur at the same resonance position, the intensity was divided by two before doing the frequency of branch occurrence calculation. If the 4-methyl branch fraction is calculated and tabulated, its contribution to the 4+methyls must be subtracted to avoid double counting.

5) Calculate the average carbon number. The average carbon number may be determined with sufficient accuracy for lubricant materials by dividing the molecular weight of the sample by 14 (the formula weight of $CH_2$).

6) The number of branches per molecule is the sum of the branches found in step 4.

7) The number of alkyl branches per 100 carbon atoms is calculated from the number of branches per molecule (step 6) times 100 divided by the average carbon number.

8) Calculate the Free Carbon Index (FCI). The FCI is expressed in units of carbons. Counting the terminal methyl or branch carbon as "one" the carbons in the FCI are the fifth or greater carbons from either a straight chain terminal methyl or from a branch methine carbon. These carbons appear between 29.9 ppm and 29.6 ppm in the carbon-13 spectrum. They are measured as follows:

a. calculate the average carbon number of the molecules in the sample as in step 5,
b. divide the total carbon-13 integral area (chart divisions or area counts) by the average carbon number from step a. to obtain the integral area per carbon in the sample,
c. measure the area between 29.9 ppm and 29.6 ppm in the sample, and
d. divide by the integral area per carbon from step b. to obtain FCI (EP1062306A1).

Branching measurements can be performed using any Fourier Transform NMR spectrometer. Preferably, the measurements are performed using a spectrometer having a magnet of 7.0T or greater. In all cases, after verification by Mass Spectrometry, UV or an NMR survey that aromatic carbons were absent, the spectral width was limited to the saturated carbon region, about 0–80 ppm vs. TMS (tetramethylsilane). Solutions of 15–25 percent by weight in chloroform-d1 were excited by 45 degrees pulses followed by a 0.8 sec acquisition time. In order to minimize non-uniform intensity data, the proton decoupler was gated off during a 10 sec delay prior to the excitation pulse and on during acquisition. Total experiment times ranged from 11–80 minutes. The DEPT and APT sequences were carried out according to literature descriptions with minor deviations described in the Varian or Bruker operating manuals.

DEPT is Distortionless Enhancement by Polarization Transfer. DEPT does not show quaternaries. The DEPT 45 sequence gives a signal for all carbons bonded to protons. DEPT 90 shows CH carbons only. DEPT 135 shows CH and $CH_3$ up and $CH_2$ 180 degrees out of phase (down). APT is Attached Proton Test. It allows all carbons to be seen, but if CH and $CH_3$ are up, then quaternaries and $CH_2$ are down. The sequences are useful in that every branch methyl should have a corresponding CH. And the methyls are clearly identified by chemical shift and phase. Both are described in the references cited. The branching properties of each sample were determined by C-13 NMR using the assumption in the calculations that the entire sample was isoparaffinic. Corrections were not made for n-paraffins or cycloparaffins, which may have been present in the oil samples in varying amounts. The cycloparaffins content was measured using Field Ionization Mass Spectroscopy (FIMS).

Elastohydrodynamic (EHD) Film Thickness:

Wormgears operate under a elastohydrodynamic lubrication regime. Elastohydrodynamic lubrication is one of the most severe forms of lubrication where a lubricating oil is expected to separate two surfaces in a mechanical device under high pressures, extremely high shear strain rates, as well as very thin lubricant films. These criteria set high demands on both the surfaces themselves and the lubricant. In order to simulate elastohydrodynamic lubrication, a ball and disc apparatus can be used. A sufficient minimum elastohydrodynamic (EHD) film thickness is desired to avoid metal to metal surface contact in wormgears and other mechanical equipment.

Elastohydrodynamic (EHD) Film Thickness Test Method:

Film Thickness data were obtained with an EHL Ultra Thin Film Measurement System from PCS Instruments, LTD. Measurements were made at 40° C., 70° C., 100° C., and 120° C. The unit utilizes a polished 19 mm diameter ball (SAE AISI 52100 steel) freely rotating on a flat glass disk coated with transparent silica spacer layer [~500 nm thick] and semi-reflective chromium layer. The load on the ball/disk was 20N resulting in an estimated average contact stress of 0.333 GPa and a maximum contact stress of 0.500 GPa. The glass disk was rotated at speeds between 0.1–3 meters/sec at a slide-to-roll ratio of 0% with respect to the steel ball. Film thickness measurements were based on ultrathin film interferometry using white light. The optical film thickness values were converted to real film thickness values from the refractive indices of the oils as measured by a conventional Abbe refractometer at the temperature of interest. Results were reported at an entrainment speed of 3 meters/sec based on a linear fit of the log film thickness data versus kinematic viscosity in cSt.

Each oil's EHD film thickness data was plotted against its respective kinematic viscosity data at each test temperature (40° C., 70° C., 100° C., and 120° C.). That is, an oil's 40° C. kinematic viscosity [x coordinate] was paired with its 40° C. EHD film thickness in nanometers [y coordinate], etc. Since kinematic viscosity information was generally only available at 40° C. and 100° C., the 70° C. and 120° C. kinematic viscosities were estimated from the 40° C. and 100° C. data using the well known Walther Equation [Log10(Log10(vis+0.6))=a−c*Log10(Temp, degrees K)]. The Walther Equation is the most widely used equation for estimating viscosities at odd temperatures and forms the basis for the ASTM D341 viscosity-temperature charts.

EHD film thicknesses vary depending on the chemical properties of the lubricating base oil. Petroleum derived Group II base oils generally have higher EHD film thicknesses than petroleum derived Group I base oils. Petroleum derived Group I base oils have higher EHD film thicknesses than PAOs. The isomerized Fischer-Tropsch derived distillate fractions of this invention have film thicknesses about the same as PAOs, which is surprising considering their very low traction coefficients.

Figure 4:
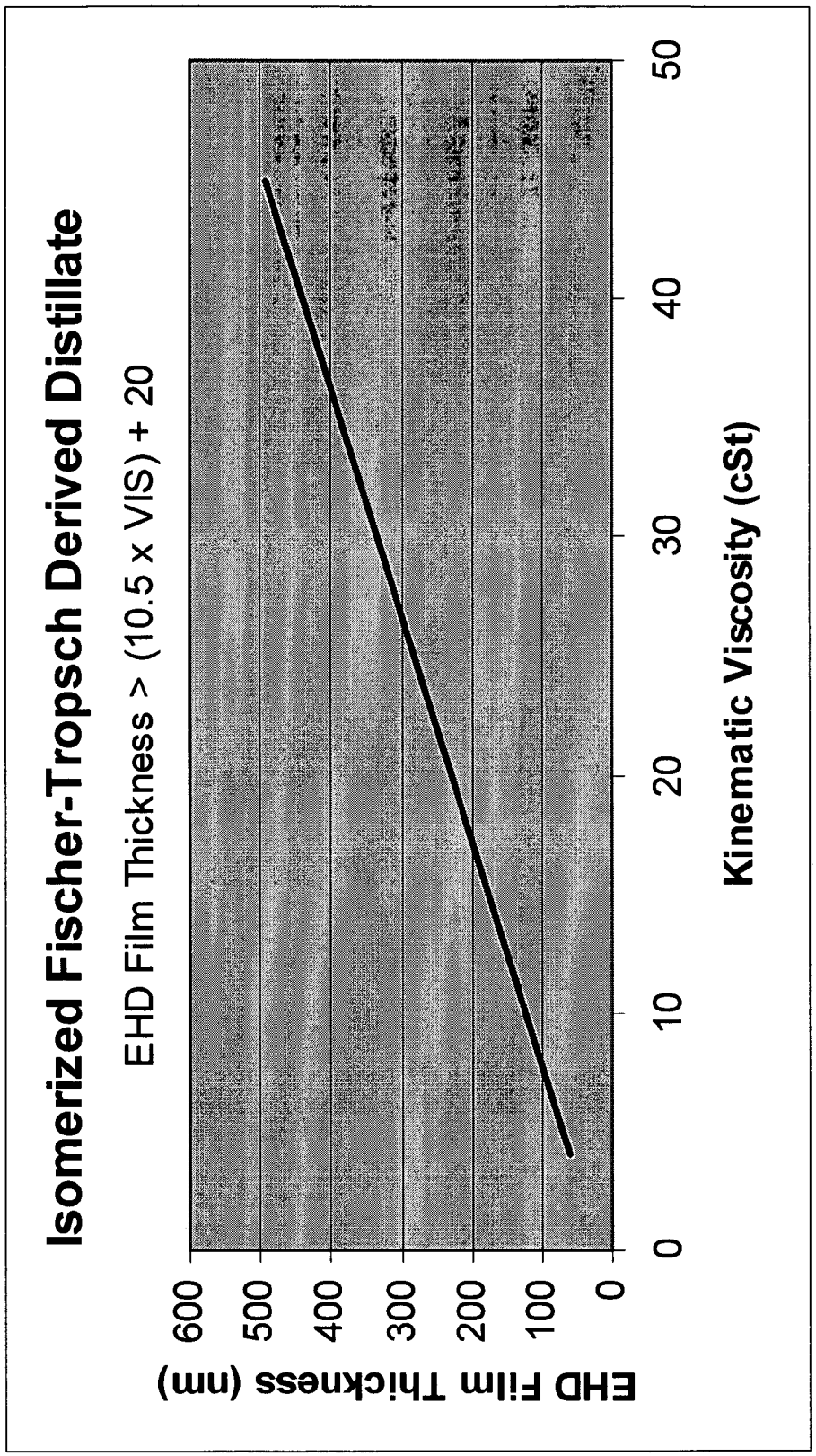
FIG. 4 illustrates the line for which the EHD film thicknesses of the isomerized Fischer-Tropsch distillate fractions of this invention will preferably fall above. The line is defined by the equation: EHD film thickness in nanometers=$(10.5 \times$Kinematic Viscosity in cSt$)+20$, wherein the Kinematic Viscosity during the EHD film thickness measurement is between 2 and 50 cSt.

The isomerized Fischer-Tropsch derived distillate fractions have an EHD film thickness greater than 175 nanometers when measured at a kinematic viscosity of 15 cSt. The EHD film thickness is greater than an amount calculated by the equation: EHD film thickness in nanometers=(10.5×Kinematic Viscosity in cSt)+20, wherein the Kinematic Viscosity during the EHD film thickness measurement is between 2 and 50 cSt using the measurement system described herein. A chart showing the equation for the minimum EHD film thickness of the isomerized Fischer-Tropsch derived distillate fraction of this invention is shown in FIG. 4.

Other Properties of the Isomerized Fischer-Tropsch Derived Distillate:

Kinematic Viscosity—The isomerized Fischer-Tropsch derived distillate fractions have a wide kinematic viscosity range, greater than 2 cSt and less than 30 cSt at 100 degrees C. Preferably they may have a kinematic viscosity greater than 3 cSt and less than 10 cSt at 100 degrees C. Kinematic viscosity is measured by ASTM D 445-03, and reported in centistokes (cSt). It is notable that their kinematic viscosities at 100 degrees C. are much lower than the low traction coefficient PAOs that have kinematic viscosities between about 150 and 1,000 cSt. Because of their desirable viscosity range they may be used neat or blended with other base oils in a wide variety of different applications.

Viscosity Index—The isomerized Fischer-Tropsch derived distillate fractions have high viscosity indexes. Their viscosity index is greater than 130. Preferably the viscosity index is greater than the amount calculated by the equation: Viscosity Index=28×Ln(Kinematic Viscosity at 100° C.)+95. Viscosity index is measured according to ASTM D 2270-93(1998).

Noack Volatility—The isomerized Fischer-Tropsch derived distillate fractions have low Noack volatility. Preferably the Noack volatility is less than an amount calculated by the equation: Noack volatility=1000×(Kinematic Viscosity at 100° C. in cSt)$^{-2.7}$, wherein the equation is a power function. Noack volatility is measured by TGA Noack, ASTM D 6375-99a.

Figure 5:
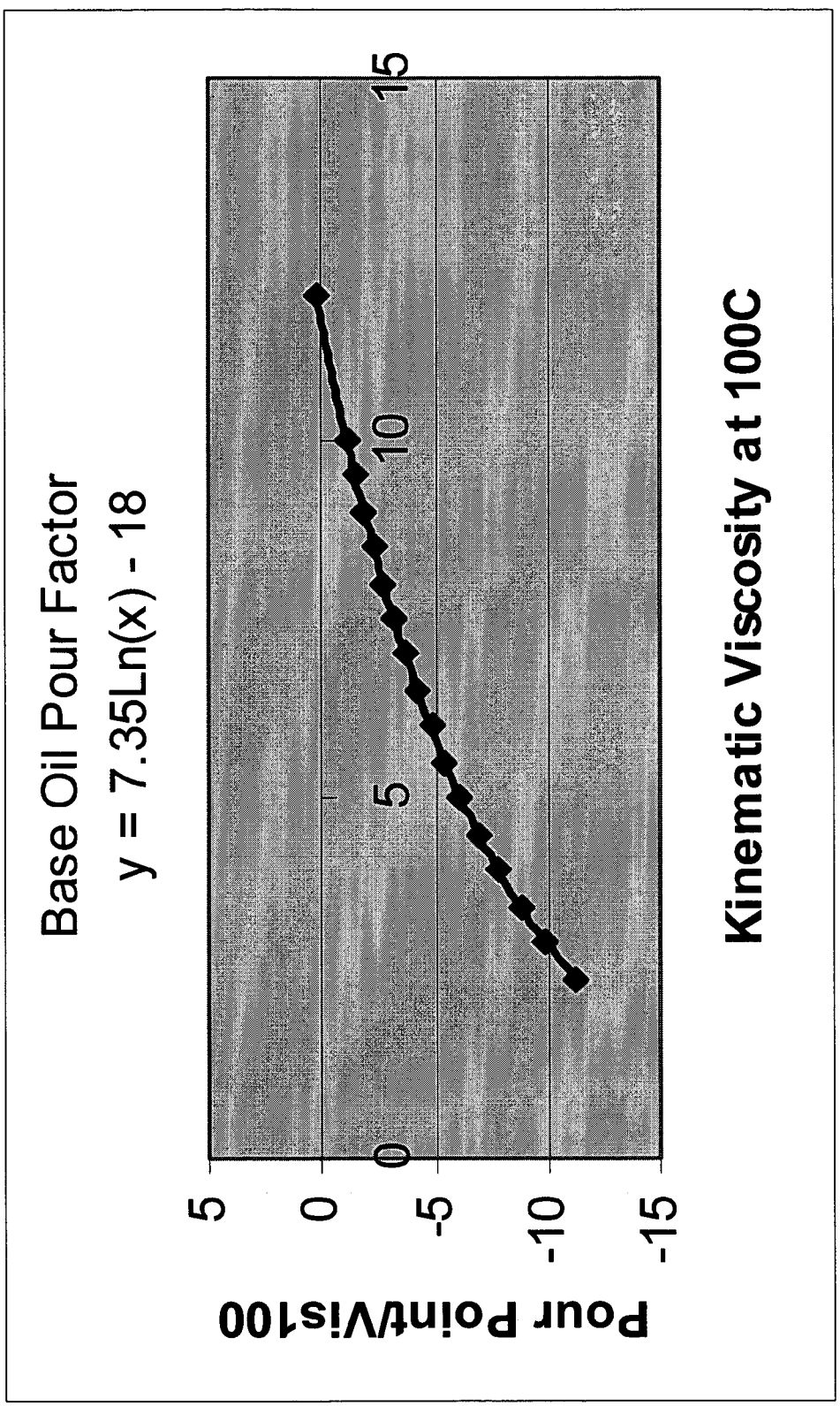
FIG. 5 illustrates the line for which, in preferred embodiments, the ratio of pour point in degrees C. to kinematic viscosity in cSt at 100 degrees C. of the Fischer-Tropsch derived distillate fraction will lie above. This line is referred to as the Base Oil Pour Factor and is calculated by the equation: Base Oil Pour Factor=$7.35 \times \mathrm{Ln}$(Kinematic Viscosity at 100° C.)$-18$, and Ln is the natural logarithm in base "e".

Base Oil Pour Factor—In preferred embodiments of this invention the isomerized Fischer-Tropsch derived distillate fractions have a ratio of pour point in degrees C. to kinematic viscosity at 100° C. in cSt greater than the Base Oil Pour Factor of said oil. The Base Oil Pour Factor (BOPF) is a function of the kinematic viscosity of the oil and is calculated by the following equation: BOPF=7.35×Ln(Kinematic Viscosity at 100° C.)−18, wherein Ln(Kinematic Viscosity) is the natural logarithm with base "e" of the kinematic viscosity at 100° C. measured in cSt. The test method used to measure pour point is ASTM D 5950-O2. The pour point is determined in one degree increments. We show a plot of this equation in FIG. 5.

Method of Operating a Wormgear Drive at High Energy Efficiency

A wormgear is operated by filling an oil reservoir designed to hold the gear lubricant with a properly formulated wormgear lubricant. Wormgears are generally in enclosed gear housings. Oil splash lubrication is the most common method of lubricating wormgears, although continuous lubrication via pump-assisted or pressure fed systems may be employed. It is important that the oil reservoir be filled and maintained at the proper level. If the wormgear is new it should be run-in at ½ the typical load before extended use. When used lubricant is being replaced, the used oil is drained from the oil reservoir prior to filling with fresh wormgear lubricant. Preferably the wormgear should be flushed and drained to remove abrasive contaminants, and a new oil filter installed. Energy savings will be appreciated when the oil reservoir is filled with the wormgear lubricant of this invention comprising an isomerized Fischer-Tropsch derived distillate fraction having a low traction coefficient, even when the used oil being replaced was one made with conventional PAO. The energy savings will be greater if the used oil being replaced is made with conventional petroleum derived base oil.

The wormgear drive is operated, after the oil reservoir is filled with the wormgear lubricant, for a period of time until the oil in the reservoir reaches an equilibrium oil temperature between 20 and 225 degrees C. The equilibrium oil temperature in the reservoir should be monitored periodically and maintained within safe operating ranges. If necessary, heat exchangers may be used to cool the lubricant reservoir. Preferably the equilibrium oil temperature is between 20 and 150 degrees C.

Process for Reducing the Traction Coefficient of a Higher-Traction Coefficient Lubricating Base Oil We have discovered a process for reducing the traction coefficient of a lubricating base oil with a higher traction coefficient by blending it with an isomerized Fischer-Tropsch derived distillate fraction having a lower traction coefficient. The lower-traction coefficient isomerized Fischer-Tropsch derived distillate fraction has a traction coefficient less than 0.023 when measured at a kinematic viscosity of 15 cSt and at a slide to roll ratio of 40 percent. The blended product will have a traction coefficient less than that of the higher-traction coefficient lubricating base oil. The process will produce a lubricating base oil blend that has a traction coefficient less than that of a petroleum derived Group I base oil, even when blended with a petroleum derived Group II base oil. The proper proportion of lower-traction coefficient isomerized Fischer-Tropsch derived distillate fraction to higher-traction coefficient lubricating base oil is between 95:5 and 5:95; preferably between 1:9 and 9:1.

In this disclosure a "higher-traction coefficient lubricating base oil" is defined as a base oil where the traction coefficient is greater than 0.024 when measured at a kinematic viscosity of 15 cSt and at a slide to roll ratio of 40 percent. More specifically, it is defined as a base oil where the traction coefficient is greater than an amount calculated by the equation: Traction Coefficient=0.009×Ln(Kinematic Viscosity), wherein the Kinematic Viscosity during the traction coefficient measurement is between 2 and 50 cSt; and wherein the traction coefficient is measured at an average rolling speed of 3 meters per second, a slide to roll ratio of 40 percent, and a load of 20 Newtons.

In this disclosure a lower-traction coefficient isomerized Fischer-Tropsch derived distillate fraction has a traction coefficient less than 0.023 when measured at a kinematic viscosity of 15 cSt and at a slide to roll ratio of 40 percent. More specifically, the traction coefficient is less than an amount calculated by the equation: Traction Coefficient=0.009×Ln(Kinematic Viscosity)−0.001, wherein the Kinematic Viscosity during the traction coefficient measurement is between 2 and 50 cSt; and wherein the traction coefficient is measured at an average rolling speed of 3 meters per second, a slide to roll ratio of 40 percent, and a load of 20 Newtons.

The base oil blend will have a traction coefficient less than an amount calculated by the equation: Traction Coefficient=0.013×Ln(Kinematic Viscosity of the lubricating base oil blend in cSt)+0.001, wherein the kinematic viscosity of the lubricating base oil blend during the traction coefficient measurement is between 2 and 50 cSt; and wherein the traction coefficient is measured at an average rolling speed of 3 meters per second, a slide to roll ratio of 40 percent, and a load of 20 Newtons.

The higher-traction coefficient lubricating base oil may be a petroleum derived base oil or a synthetic base oil. Examples include petroleum derived Group I base oil, petroleum derived Group II base oil, petroleum derived Group III base oil, polyalphaolefin, polyinternalolefin, and mixtures thereof. Prior to this invention the base oils with the lowest traction coefficients known were ultra high viscosity polyalphaolefins. By blending isomerized Fischer-Tropsch derived distillate fractions, instead of conventional or ultra high viscosity polyalphaolefins, to improve traction coefficients; a lubricating base oil blend may be made at significantly lower cost in the future. The most beneficial effect is achieved with blends of isomerized Fischer-Tropsch derived distillate fractions with petroleum derived Group II base oils, which have an especially high traction coefficient.

The preferred lower-traction coefficient isomerized Fischer-Tropsch derived distillate fraction used in blending will have a weight percent aromatics less than 0.30, a weight percent of molecules with cycloparaffin functionality greater than 3, and a ratio of weight percent of molecules with monocycloparaffin functionality to weight percent of molecules with multicycloparaffin functionality greater than 15. The lower-traction coefficient isomerized Fischer-Tropsch derived distillate fraction preferably has a Free Carbon Index between 2 and 12, preferably between 3 and 10. The lower-traction coefficient isomerized Fischer-Tropsch derived distillate fraction additionally has less than 12, preferably less than 10 alkyl branches per 100 carbons. In preferred embodiments the lower-traction coefficient isomerized Fischer-Tropsch derived distillate fraction has a kinematic viscosity greater than 2 and less than 30 cSt, preferably greater than 3 and less than 10 cSt; and a viscosity index greater than 130, preferably greater than an amount calculated by the equation: Viscosity Index=28×Ln(Kinematic Viscosity at 100° C.)+95. Wormgear Lubricant Composition Isomerized Fischer-Tropsch derived distillate fractions of this invention are useful in finished lubricants made for many types of equipment, including, but not limited to, engines, industrial gear boxes, automotive gears, hydraulic equipment, compressors, pumps, turbines, and shock absorbers. The energy losses due to traction are greatly reduced, leading to improved equipment operation, high energy efficiency, low component wear, and longer lubricant life. In addition the isomerized Fischer-Tropsch derived distillate fractions of this invention will reduce equilibrium oil temperature and reduce micro-pitting of steel gears. Isomerized Fischer-Tropsch derived distillate fractions of this invention with low traction coefficients and desirable EHD film thicknesses are especially useful when blended into wormgear lubricants, where there is sliding under low to moderate loads with little to no boundary lubrication.

Wormgear lubricants of this invention generally comprise a) an isomerized Fischer-Tropsch derived distillate fraction having a low traction coefficient, and b) between 2 and 50 weight percent thickener. Preferably the traction coefficient of the isomerized Fischer-Tropsch derived distillate fraction is less than 0.023, when measured at 15 cSt kinematic viscosity and at a slide to roll ratio of 40 percent. The wormgear lubricant may be in the range of ISO 68 to ISO 680. To achieve these relatively high ranges of ISO grades a thickener is added in an amount between 2 and 50 weight percent, preferably between 5 and 30 weight percent, of the total fraction. Examples of thickeners are polyisobutylene, high molecular weight complex ester, butyl rubber, olefin copolymers, styrene-diene polymer, polymethacrylate, styrene-ester, and ultra high viscosity PAO. Preferably the thickener is a polyisobutulene, or high molecular weight complex ester with a kinematic viscosity between 1,000 and 10,000 cSt at 100 degrees C., more preferably with a kinematic viscosity between 2,000 and 8,000 cSt at 100 degrees C. An example of a high molecular weight complex ester that is useful in the composition of this invention is Priolube® 3986. To achieve thickening and also impart low traction coefficient properties an ultra high viscosity PAO may also be used in the formulation. As used in this disclosure, an "ultra high viscosity PAO" has a kinematic viscosity between about 150 and 1,000 cSt or higher at 100 degrees C.

The wormgear lubricant may additionally comprise a base oil other than an isomerized Fischer-Tropsch derived distillate fraction. The resulting wormgear lubricant will still have an excellent low traction coefficient. The additional base oil may be one of the following: conventional PAO, alkylated naphthalene, polyinternalolefin (PIO), petroleum derived Group I, petroleum derived Group II, petroleum derived Group III, and mixtures thereof. Examples of preferred alkylated naphthalenes are Synesstic™ AN blendstocks. Polyinternalolefin base oils are synthesized lubricant base oils made from internal olefins. Issue 9, June 2003, of the ATIEL Code of Practice categorizes polyinternalolefin base oils as Group VI base oils. A preferred embodiment is a wormgear lubricant comprising a thickener selected from the group of polyisobutylene, high molecular weight complex ester, ultra high viscosity PAO, and mixtures thereof; and an additional base oil as listed previously.

Synesstic™ is a trademark of ExxonMobil Chemical. Priolube® is a registered trademark of Uniqema™. Uniqema™ is a trademark of the ICI group of companies.

Other additives which may be blended with the isomerized Fischer-Tropsch derived distillate fraction to form the wormgear composition include those which are intended to improve certain properties of the composition. Typical additives include, for example, anti-wear additives, EP agents, antioxidants, pour point depressants, viscosity index improvers, viscosity modifiers, friction modifiers, demulsifiers, antifoaming agents, corrosion inhibitors, rust inhibitors, seal swell agents, emulsifiers, wetting agents, lubricity improvers, metal deactivators, gelling agents, tackiness agents, bactericides, fluid-loss additives, colorants, and the like. If EP agents are used they must be selected carefully such that they do not adversely interact with the bronze metal in the wormgear. Typically, the total amount of additives in the wormgear lubricant, other than base oil and thickener is less than 10 wt %, preferably less than 5 wt %. Preferably the isomerized Fischer-Tropsch derived distillate fraction is present in an amount between 10 and 93 weight percent of the total composition.

In preferred embodiments the isomerized Fischer-Tropsch derived distillate fraction will have less than 0.30 weight percent aromatics, more preferably less than 0.10, most preferably less than 0.05. The isomerized Fischer-Tropsch derived distillate fraction will have a weight percent of molecules with cycloparaffin functionality greater than 3, more preferably greater than 10; and a ratio of molecules with monocycloparaffin functionality to molecules with multicycloparaffin functionality greater than 15, more preferably greater than 50. The isomerized Fischer-Tropsch derived distillate fraction will have a high VI, generally greater than 130, and preferably greater than an amount calculated by the equation: Viscosity Index=$28 \times Ln(Kinematic\ Viscosity\ at\ 100°\ C.)+95$.

In preferred embodiments the wormgear lubricant of this invention will have a color by ASTM D 1500 less than 2.0, preferably less than 1.0. In addition, it will have a passing result for rust in the ASTM D 665 test using distilled water; low foaming tendency and stability in the Sequence I foam test by ASTM D 892; and less than 5 ml emulsion after 30 minutes at 82 degrees C. by ASTM D 1401.

Lubricant additive suppliers will provide information on effective amounts of their individual additives or additive packages to be blended with lubricating base oils to make wormgear lubricants. However due to the excellent properties of the isomerized Fischer-Tropsch derived distillate fractions of the invention, less additives than required with base oils made by other processes may be required to meet the specifications for the finished lubricant. The high oxidation stability of the isomerized Fischer-Tropsch derived distillate fractions of this invention will require lower amounts of antioxidants be used in the finished lubricants comprising them. The use of additives in formulating finished lubricants is well documented in the literature and well within the ability of one skilled in the art. Therefore, additional explanation should not be necessary in this disclosure.

The isomerized Fischer-Tropsch derived distillate fraction used in the blended lubricating base oils and blended finished lubricants of the present invention may be manufactured at a site different from the site at which the components of the blended lubricant are received and blended. In addition, the blended finished lubricant may be manufactured at a site different from the site at which the components of the blended lubricating base oil are received and blended. Preferably, the blended lubricating base oil and the blended finished lubricant are made at the same site, which site is different from the site at which the isomerized Fischer-Tropsch derived distillate fraction is originally made. Accordingly, the isomerized Fischer-Tropsch derived distillate fraction is manufactured as a first site and shipped to a second remote site. The second remote site receives the isomerized Fischer-Tropsch derived distillate fraction, any other lubricant base oils, and the additives; and the blended finished lubricant is manufactured at this second site.

EXAMPLES

The following examples are included to further clarify the invention but are not to be construed as limitations on the scope of the invention.

Fischer-Tropsch Wax

One commercial sample of hydrotreated Fischer-Tropsch wax made using a Fe-based Fischer-Tropsch synthesis catalyst (WAX A) and two samples of hydrotreated Fischer-Tropsch wax made using a Co-based Fischer-Tropsch catalyst (WAX B and WAX C) were analyzed and found to have the properties shown in Table I.

TABLE I

Fischer-Tropsch Wax

| | Fischer-Tropsch Catalyst | | |
|---|---|---|---|
| Sample ID | Fe-Based WAX A | Co-Based WAX B | Co-Based WAX C |
| Sulfur, ppm | | 7, <2* | <6 |
| Nitrogen, ppm | 2, 4, 4, 1, 4, 7* | 12, 19* | 6, 5* |
| Oxygen by Neutron Activation, Wt % | 0.15 | | 0.59 |
| GC N-Paraffin Analysis | | | |
| Total N Paraffin, Wt % | 92.15 | 83.72 | 84.47 |
| Avg. Carbon Number | 41.6 | 30.7 | 27.3 |
| Avg. Molecular Weight | 585.4 | 432.5 | 384.9 |
| SIMDIST TBP (WT %), ° F. | | | |
| T0.5 | 784 | 129 | 515 |
| T5 | 853 | 568 | 597 |
| T10 | 875 | 625 | 639 |
| T20 | 914 | 674 | 689 |
| T30 | 941 | 717 | 714 |
| T40 | 968 | 756 | 751 |
| T50 | 995 | 792 | 774 |
| T60 | 1013 | 827 | 807 |
| T70 | 1031 | 873 | 839 |
| T80 | 1051 | 914 | 870 |
| T90 | 1081 | 965 | 911 |
| T95 | 1107 | 1005 | 935 |
| T99.5 | 1133 | 1090 | 978 |

*replicates

The Fischer-Tropsch wax feeds were hydroisomerized over a Pt/SAPO-11 catalyst on an alumina binder. Run conditions were between 652 and 695° F. (344 and 368° C.), 0.6 to 1.0 LHSV, 1000 psig reactor pressure, and a once-through hydrogen rate of between 6 and 7 MSCF/bbl. The reactor effluent passed directly to a second reactor, also at 1000 psig, which contained a Pt/Pd on silica-alumina hydrofinishing catalyst. Conditions in that reactor were a temperature of 4500 F and LHSV of 0.5–2.0.

The fractions boiling above about 600° F. were fractionated by atmospheric or vacuum distillation to produce distillate fractions of different viscosity grades. Test data on specific distillate fractions useful as isomerized Fischer-Tropsch distillate fractions of this invention are shown in the following examples.

Isomerized Fischer-Tropsch Derived Distillate Fractions

Five different isomerized Fischer-Tropsch distillate fractions were made over a range of kinematic viscosities as shown in Table II.

addition these examples have good EHD film thicknesses and desirable branching properties. The EHD film thicknesses of these examples were greater than an amount in nanometers calculated by the equation: EHD Film Thickness=(10.5×Kinematic Viscosity)+20, wherein the Kinematic Viscosities during the EHD film thickness measurements were between 2 and 50 cSt.

Four different isomerized Fischer-Tropsch distillate fractions with kinematic viscosities at about 4.3 cSt at 100° C. were prepared. These were made by hydroisomerization dewaxing of hydrotreated Co-based FT wax. They were hydroisomerized over a Pt/SAPO-11 catalyst at 290 psig total pressure, 0.5–2.0 LHSV, 660–700° F., and 5.3 MSCF/bbl recycle H2, and hydrofinished over a Pt—Pd/SiO2-Al2O3 at 450° F. and 0.5–2 LHSV, using the same pressure and H2 rate. FT-4.3D was re-hydrofinished over the same hydrofinishing catalyst at 0.5–2.0 LHSV, 450° F., 1000 psig, and 5 MSCF/bbl once-through H2. FT-4.3C was re-hy-

TABLE II

| Properties | FT-2.6 | FT-4.1 | FT-4.5 | FT-6.3 | FT-8 |
| --- | --- | --- | --- | --- | --- |
| FT Wax | WAX B | WAX C | WAX A | WAX A | WAX B |
| IDW Catalyst | Pt/SAPO-11 | Pt/SAPO-11 | Pt/SAPO-11 | Pt/SAPO-11 | Pt/SAPO-11 |
| Pour Point, ° C. | −30 | −20 | −17 | −14 | −12 |
| Viscosity at 100° C., cSt | 2.583 | 4.104 | 4.524 | 6.295 | 7.953 |
| Viscosity Index | 133 | 145 | 149 | 154 | 165 |
| Ratio of Pour Point/Vis100 | −11.61 | −4.87 | −3.76 | −2.22 | −1.51 |
| Base Oil Pour Factor | −11.02 | −7.62 | −6.91 | −4.48 | −2.76 |
| FIMS, Wt % of Molecules | | | | | |
| Paraffins | 93.0 | 88.4 | 89.4 | 76.0 | 87.2 |
| Monocycloparaffins | 7.0 | 11.6 | 10.4 | 22.1 | 12.6 |
| Multicycloparaffins | 0.0 | 0.0 | 0.2 | 1.1 | 0.2 |
| Total | 100.0 | 100.0 | 100.0 | 100.0 | 100.0 |
| Monocycloparaffins/Multicycloparaffins | >100 | >100 | 52 | 20 | 63 |
| Aromatics, Wt % | | | 0.0109 | 0.0141 | |
| Noack Volatility, Wt % | 48.94 | 14.43 | 12.53 | 3.12 | 2.72 |
| Sim Dist., Wt %, ° F. | | | | | |
| IBP/5 | 595/618 | 643/729 | 684/716 | 803/827 | 799/824 |
| 10/30 | 630/673 | 741/770 | 732/792 | 841/881 | 830/877 |
| 50 | 713 | 801 | 843 | 912 | 919 |
| 70/90 | 754/802 | 838/888 | 883/917 | 943/982 | 977/1076 |
| 95/FBP | 816/833 | 907/949 | 929/951 | 996/1031 | 1120/1193 |
| Free Carbon Index | 4.1 | 4.20 | 4.20 | 8.1 | |
| Alkyl Branches/100 Carbons | 7.7 | 7.22 | 7.48 | 7.21 | |
| Traction Coefficient | | | | | |
| VIS/Traction Coef. | 15/0.022 | 4.1/0.010 | 4.5/0.010 | 6.3/0.012 | 8/0.013 |
| | | 8.0/0.016 | 15/0.020 | 12.5/0.0175 | 15/0.017 |
| | | 15/0.021 | | 15/0.020 | 16/0.018 |
| | | 17/0.023 | | 32/0.024 | 42/0.025 |

FT-2.6, FT-4.1, FT-4.5, FT-6.3, and FT-8 are all examples of the isomerized Fischer-Tropsch derived distillate fractions of this invention with very low traction coefficients, low aromatics, and desirable cycloparaffin composition. In drofinished the same way as for FT-4.3D, except that the pressure was 500 psig. The properties of these four isomerized Fischer-Tropsch distillate fractions are shown in Table III.

TABLE III

| Properties | FT-4.3A Hydrofinished Once at 290 psig | FT-4.3B Hydrofinished Once at 290 psig | FT-4.3C Hydrofinished Twice, Once at 290 psig, then again at 1000 psig | FT-4.3D Hydrofinished Twice, Once at 290 psig, then again at 500 psig |
| --- | --- | --- | --- | --- |
| Pour Point, ° C. | −17 | −25 | −21 | −19 |
| Viscosity at 100° C., cSt | 4.3 | 4.3 | 4.316 | 4.315 |

TABLE III-continued

| Properties | FT-4.3A Hydrofinished Once at 290 psig | FT-4.3B Hydrofinished Once at 290 psig | FT-4.3C Hydrofinished Twice, Once at 290 psig, then again at 1000 psig | FT-4.3D Hydrofinished Twice, Once at 290 psig, then again at 500 psig |
|---|---|---|---|---|
| Viscosity Index | 147 | | 159 | 157 |
| Ratio of Pour Point/Vis100 | | | −4.87 | −4.40 |
| Base Oil Pour Factor | | | −7.25 | −7.25 |
| FIMS, Wt % of Molecules | | | | |
| Paraffins | 86.9 | 87.3 | 94.4 | 96.4 |
| Monocycloparaffins | 10.1 | 9.6 | 5.6 | 3.6 |
| Multicycloparaffins | 3.0* | 3.1* | 0.0 | 0.0 |
| Total | 100.0 | 100.0 | 100.0 | 100.0 |
| Monocycloparaffins/ Multicycloparaffins | — | — | >100 | >100 |
| Aromatics, Wt % | 3.0 | 3.1 | 0.2 | 0.2 |
| Free Carbon Index | | | 5.2 | 5.2 |
| Alkyl Branches/100 Carbons | | | 8.76 | 9.62 |
| Traction Coefficient | | | | |
| VIS/Traction Coef. | | | 4.3/0.009 | 4.3/0.009 |
| | | | 8.5/0.014 | 8.5/0.014 |
| | | | 15/0.018 | 15/0.018 |
| | | | 19/0.021 | 19/0.021 |

*Aromatic molecules were measured by FIMS and misidentified as multicycloparaffins.

Both FT-4.3C and FT-4.3D were found to have exceptionally low traction coefficients and high viscosity indexes. Their viscosity indexes were more than 20 higher than the amount defined by the equation: Viscosity Index=28×Ln (Kinematic Viscosity at 100° C.)+95. They also have branching properties within the preferred range of Free Carbon Index between 3 and 10, and additionally having less than 10 alkyl branches per 100 carbons.

Traction Coefficients of Comparative Base Oils

Four different types of comparative base oils were tested for traction coefficient in the same manner as the Fischer-Tropsch derived distillate fractions. The four different types were petroleum derived Group I, petroleum derived Group II, petroleum derived Group III, and conventional polyalphaolefin (PAO). The petroleum derived Group I base oils were Exxon 100SN, Exxon 330SN, and Exxon 500SN. The petroleum derived Group II base oils were ChevronTexaco 100R, ChevronTexaco 220R, ChevronTexaco 240R, ChevronTexaco 500R, and ChevronTexaco 600R. The petroleum derived Group III base oils were PetroCanada VHVI 4, PetroCanada VHVI 6, NEXBASE™ 3043, NEXBASE™ 3060, ChevronTexaco 4R, ChevronTexaco 6R, BP HC-4, BP HC-6, YUBASE™-4, and YUBASE™-6. Conventional PAO base oils have kinematic viscosities at 100° C. less than 150 cSt. The conventional PAO base oils tested were CP Chem Synfluid® PAO 2 CST, CP Chem Synfluid® 4 CST, CP Chem Synfluid® 6 CST, CP Chem Synfluid® 7 CST, and CP Chem Synfluid® 8 CST.

NEXBASE™ is a registered trademark of Fortum Base Oils. YUBASE™ is a registered trademark of SK Corporation. Synfluid® is a registered trademark of Chevron Phillips Chemical Company.

The equation to approximate the traction coefficients of the petroleum derived Group II base oils was: Traction Coefficient=0.012×Ln(VIS)+0.0084, where VIS is the kinematic viscosity of the oil during the test measurement in cSt. The equation to approximate the traction coefficients of petroleum derived Group I base oils was: Traction Coefficient=0.013×Ln(VIS)+0.001, where VIS is kinematic viscosity in cSt. The equation to approximate the traction coefficients of petroleum derived Group III base oils was: Traction Coefficient=0.0107×Ln(VIS)−0.0027. The equation to approximate the traction coefficients of conventional PAOs with kinematic viscosities less than about 150 cSt at 100 degrees C. was: Traction Coefficient=0.009×Ln(VIS)−0.001. The VIS in each equation will vary depending on the test temperature and the viscosity index of the oil being tested. The VIS range of the traction coefficient equations is between 2 and 50 cSt. Plots of these different equations for the comparison base oils we tested are shown in FIG. 1.

EHD Film Thicknesses of Comparative Base Oils

Figure 3:
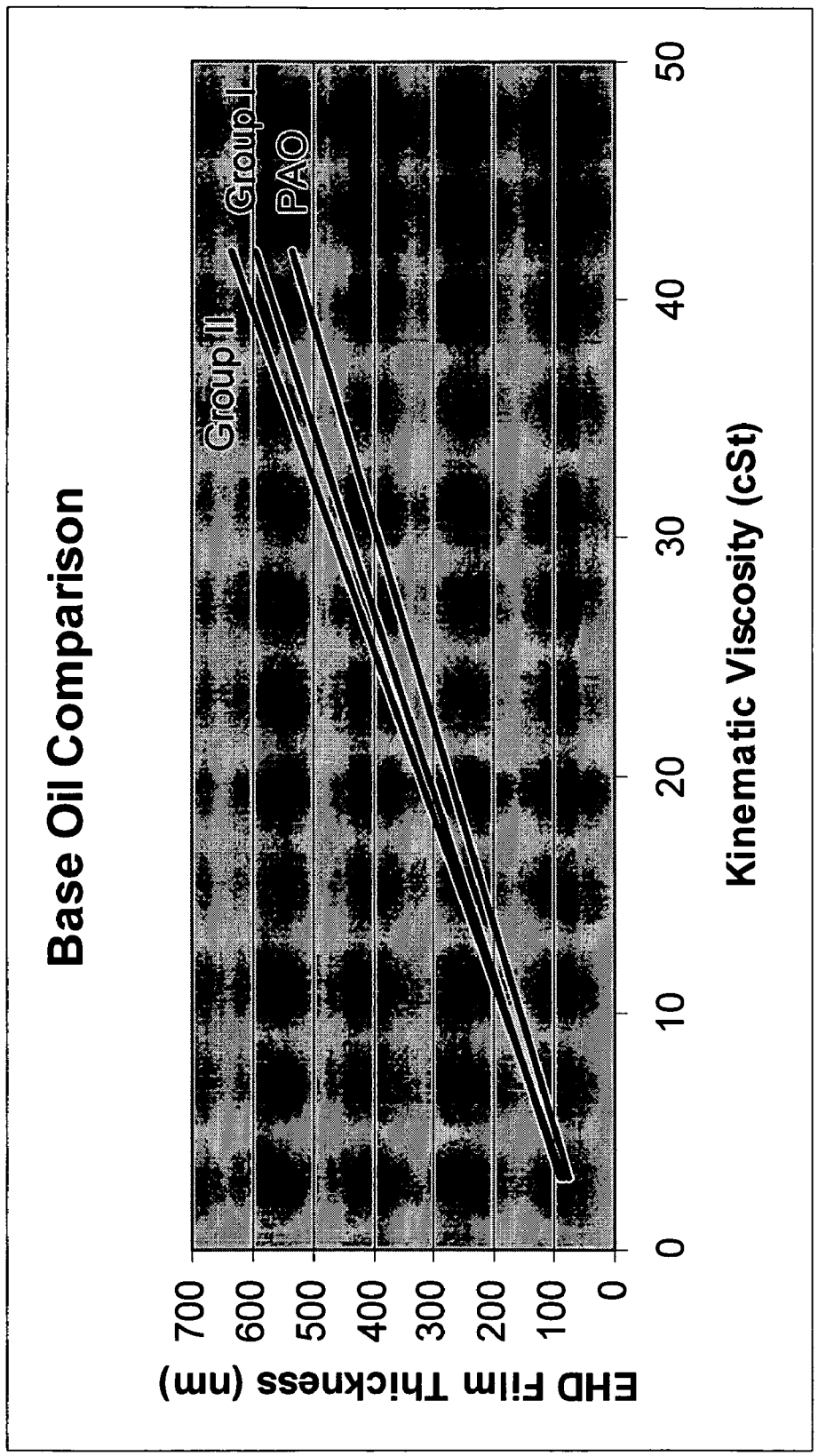
FIG. 3 illustrates the plots of Kinematic Viscosity in cSt vs. elastohydrodynamic (EHD) film thickness in nanometers for three types of comparison base oils, including petroleum derived Group II base oils, petroleum derived Group I base oils, and polyalphaolefin base oils. Each oil's EHD film thickness data was plotted against its respective kinematic viscosity data at each test temperature (40° C., 70° C., 100° C., and 120° C.). Lines fitting the data for each comparison base oil type were plotted and are shown in the figure.

Three different types of comparative base oils were tested for EHD film thickness. The three types of comparative base oils were petroleum derived Group II, petroleum derived Group I, and PAO. The same comparative base oils were tested as were tested for traction coefficient, excluding the petroleum derived Group III base oils. A chart showing the EHD film thicknesses of these three different types of comparative base oils is shown in FIG. 3.

Blends of Fischer-Tropsch Derived Distillate Fractions and Petroleum Derived Base Oils Four blends of the lower-traction coefficient FT-2.6 example in Table II were made with higher-traction coefficient petroleum derived lubricating base oils. Two blends were made with Exxon Europe Heavy Neutral Group I base oil, Exxon 500SN. One blend was made with ChevronTexaco 220R Medium Neutral Group II base oil, and one blend was made with ChevronTexaco 600R Heavy Neutral Group II base oil. The amount of the lower-traction coefficient FT-2.6 used in these blends varied between 45 and 70 weight percent of the total blend. The traction coefficients of these blends were reduced below the original higher-traction coefficients of the petroleum derived lubricating base oils, showing a benefit in reducing traction coefficients with the blending. In most cases the traction coefficients were less than an amount typical for a Group I base oil, which is especially surprising for the blends with especially higher-traction coefficient petroleum derived Group II base oil. The equation for the traction coefficient of Group I base oils is: Traction Coefficient=0.013×Ln(VIS)+0.0006, wherein VIS is the kinematic viscosity over a range of 2 to 50 cSt. With the addition of FT-2.6 base oil to petroleum derived lubricating base oils a benefit in lowered traction coefficient was achieved. It is expected that the fuel economy, frictional heat losses, and energy efficiency of blends and finished lubricant made with the lower-traction coefficient isomerized Fischer-Tropsch distillate fractions of this invention having a kinematic viscosity greater than 2 cSt and less than 30 cSt would be much better than with blends and finished lubricants made of all petroleum derived base oils.

All of the publications, patents and patent applications cited in this application are herein incorporated by reference in their entirety to the same extent as if the disclosure of each individual publication, patent application or patent was specifically and individually indicated to be incorporated by reference in its entirety.

Many modifications of the exemplary embodiments of the invention disclosed above will readily occur to those skilled in the art. Accordingly, the invention is to be construed as including all structure and methods that fall within the scope of the appended claims.

What is claimed is:

1. A method of operating a wormgear drive at high energy efficiency, comprising:
   a. filling an oil reservoir with a wormgear lubricant comprising an isomerized Fischer-Tropsch derived distillate fraction having a traction coefficient less than or equal to 0.021, when measured at a kinematic viscosity of 15 cSt and at a slide to roll ratio of 40 percent; and
   b. operating the wormgear drive having the filled oil reservoir at an equilibrium oil temperature in the oil reservoir between 20 and 225 degrees C.

2. The method of claim 1 wherein the equilibrium oil temperature is between 20 and 150 degrees C.

3. The method of claim 1 additionally comprising the step of draining the oil reservoir of used oil prior to filling.

4. The method of claim 1 wherein the traction coefficient is less than an amount calculated by the equation: Traction Coefficient=0.009×Ln(Kinematic Viscosity in cSt)−0.001, wherein the Kinematic Viscosity during the traction coefficient measurement is between 2 and 50 cSt; and wherein the traction coefficient is measured at an average rolling speed of 3 meters per second, a slide to roll ratio of 40 percent, and a load of 20 Newtons.

5. The method of claim 1 wherein the isomerized Fischer-Tropsch derived distillate fraction has a weight percent aromatics less than 0.30.

6. The method of claim 5 wherein the isomerized Fischer-Tropsch derived distillate fraction has a weight percent aromatics less than 0.10.

7. The method of claim 1 wherein the isomerized Fischer-Tropsch derived distillate fraction has a weight percent of molecules with cycloparaffin functionality greater than 3.

8. The method of claim 7 wherein the isomerized Fischer-Tropsch derived distillate fraction has a weight percent of molecules with cycloparaffin functionality greater than 5.

9. The method of claim 8 wherein the isomerized Fischer-Tropsch derived distillate fraction has a weight percent of molecules with cycloparaffin functionality greater than 10.

10. The method of claim 1 wherein the isomerized Fischer-Tropsch derived distillate fraction has a kinematic viscosity at 100 degrees C. greater than 2 cSt and less than 30 cSt.

11. The method of claim 10 wherein the isomerized Fischer-Tropsch derived distillate fraction has a kinematic viscosity at 100 degrees C. greater than 3 cSt and less than 10 cSt.

12. The method of claim 1 wherein the isomerized Fischer-Tropsch derived distillate fraction has a ratio of pour point in degrees C. to kinematic viscosity at 100 degrees C. in cSt greater than the Base Oil Pour Factor as calculated by the following equation:
Base Oil Pour Factor=7.35×Ln(Kinematic Viscosity at 100° C.)−18.

13. The method of claim 1 wherein the isomerized Fischer-Tropsch derived distillate fraction has a Free Carbon Index between 2 and 12, and additionally contains less than 12 alkyl branches per 100 carbons.

14. The method of claim 13 wherein the isomerized Fischer-Tropsch derived distillate fraction has a Free Carbon Index between 3 and 10, and additionally contains less than 10 alkyl branches per 100 carbons.

15. The method of claim 1 wherein the isomerized Fischer-Tropsch derived distillate fraction has an elastohydrodynamic (EHD) film thickness greater than 175 nanometers when measured at a kinematic viscosity of 15 cSt.

16. The method of claim 15 wherein the EHD film thickness is greater than an amount calculated by the equation: EHD film thickness in nanometers=(10.5×Kinematic Viscosity in cSt)+20, wherein the Kinematic Viscosity during the EHD film thickness measurement is between 2 and 50 cSt; measured at an entrainment speed of 3 meters per second, a slide to roll ratio of zero percent, and a load of 20 Newtons.

17. The method of claim 1 wherein the Noack volatility is less than an amount calculated by the equation: Noack Volatility=1000×(Kinematic Viscosity at 100° C. in cSt)$^{-2.7}$.

18. The method of claim 1 wherein the viscosity index is greater than an amount calculated by the equation: Viscosity Index=28×Ln(Kinematic Viscosity at 100° C.)+95.

19. A process for reducing the traction coefficient of a higher-traction coefficient lubricating base oil having a traction coefficient greater than 0.024 when measured at a kinematic viscosity of 15 cSt and at a slide to roll ratio of 40 percent, comprising:
   a. recovering an isomerized Fischer-Tropsch derived distillate fraction having a traction coefficient less than or equal to 0.021, when measured at a kinematic viscosity of 15 cSt and at a slide to roll ratio of 40 percent; and
   b. blending the isomerized Fischer-Tropsch derived distillate fraction with the higher-traction coefficient lubricating base oil in the proper proportion to produce a lubricating base oil blend having a traction coefficient less than the traction coefficient of the higher-traction coefficient lubricating base oil.

20. The process of claim 19 wherein the traction coefficient of the lower-traction coefficient isomerized Fischer-Tropsch derived distillate fraction is less than an amount calculated by the equation: Traction Coefficient=0.009×Ln (Kinematic Viscosity of the lower-traction coefficient lubricating base oil in cSt)−0.001; wherein the traction coefficient is measured at an average rolling speed of 3 meters per second, a slide to roll ratio of 40 percent, and a load of 20 Newtons.

21. The process of claim 19 wherein the lubricating base oil blend has a traction coefficient less than an amount calculated by the equation: traction coefficient=0.013×Ln (Kinematic Viscosity of the lubricating base oil blend in cSt)+0.001, wherein the Kinematic Viscosity of the lubricating base oil blend during the traction coefficient measurement is between 2 and 50 cSt; and wherein the traction coefficient is measured at an average rolling speed of 3 meters per second, a slide to roll ratio of 40 percent, and a load of 20 Newtons.

22. The process of claim 19 wherein the higher-traction coefficient lubricating base oil is selected from the group consisting of polyalphaolefin, polyinternalolefin, petroleum derived Group I base oil, petroleum derived Group II base oil, petroleum derived Group III base oil, and mixtures thereof.

23. The process of claim 22 wherein the higher-traction coefficient lubricating base oil is a petroleum derived Group II base oil.

24. The process of claim 19 wherein the higher-traction coefficient lubricating base oil has a traction coefficient greater than an amount calculated by the equation: Traction coefficient=0.009×Ln(Kinematic Viscosity of the higher-traction coefficient lubricating base oil in cSt), wherein the Kinematic Viscosity of the higher-traction coefficient lubricating base oil during the traction coefficient measurement is between 2 and 50 cSt; and wherein the traction coefficient is measured at an average rolling speed of 3 meters per second, a slide to roll ratio of 40 percent, and a load of 20 Newtons.

25. The process of claim 19 wherein the isomerized Fischer-Tropsch derived distillate fraction has a weight percent aromatics less than 0.30.

26. The process of claim 25 wherein the isomerized Fischer-Tropsch derived distillate fraction has a weight percent of molecules with cycloparaffin functionality greater than 3 and a ratio of weight percent of molecules with monocycloparaffin functionality to weight percent of molecules with multicycloparaffin functionality greater than 15.

27. The process of claim 19 wherein the isomerized Fischer-Tropsch derived distillate fraction has a Free Carbon Index between 3 and 10, and additionally contains less than 10 alkyl branches per 100 carbons.

28. The process of claim 19 wherein the isomerized Fischer-Tropsch derived distillate fraction has a kinematic viscosity at 100 degrees C. greater than 2 cSt and less than 30 cSt.

29. The process of claim 19 wherein the isomerized Fischer-Tropsch derived distillate fraction has a viscosity index greater than the amount calculated by the equation: Viscosity Index=28×Ln(Kinematic Viscosity at 100° C.)+95.

30. A wormgear lubricant comprising:
a. an isomerized Fischer-Tropsch derived distillate fraction having:
   i. a traction coefficient less than or equal to 0.021, when measured at a kinematic viscosity of 15 cSt and at a slide to roll ratio of 40 percent; and
b. between 2 and 50 weight percent thickener selected from the group consisting of polyisobutylene, high molecular weight complex esters, butyl rubber, olefin copolymers, styrene-diene polymer, polymethacrylate, styrene ester, and mixtures thereof.

31. The wormgear lubricant of claim 30 wherein the isomerized Fischer-Tropsch derived distillate fraction has a traction coefficient less than amount calculated by the equation: traction coefficient=0.009×Ln(Kinematic Viscosity)−0.001, wherein the Kinematic Viscosity during the traction coefficient measurement is between 2 and 50 cSt; and wherein the traction coefficient is measured at an average rolling speed of 3 meters per second, a slide to roll ratio of 40 percent, and a load of 20 Newtons.

32. The wormgear lubricant of claim 30 wherein the isomerized Fischer-Tropsch derived distillate fraction is present in an amount between 10 and 93 weight percent of the total composition.

33. The wormgear lubricant of claim 30 wherein the isomerized Fischer-Tropsch derived distillate fraction has a weight percent aromatics less than 0.30.

34. The wormgear lubricant of claim 30 wherein the isomerized Fischer-Tropsch derived distillate fraction has:
a. a weight percent of molecules with cycloparaffin functionality greater than 3; and
b. a ratio of weight percent of molecules with monocycloparaffin functionality to weight percent of molecules with multicycloparaffin functionality greater than 15.

35. The wormgear lubricant of claim 30 wherein the isomerized Fischer-Tropsch distillate fraction has a viscosity index greater than an amount calculated by the equation: Viscosity Index=28×Ln(Kinematic Viscosity at 100° C.)+95.

36. The wormgear lubricant of claim 30 additionally comprising a base oil selected from the group consisting of conventional PAO, alkylated naphthalene, polyinternalolefin, petroleum derived Group I, petroleum derived Group II, petroleum derived Group III, and mixtures thereof.

37. The wormgear lubricant of claim 30 wherein the thickener is selected from the group consisting of polyisobutylene, high molecular weight complex ester, and mixtures thereof.

38. The wormgear lubricant of claim 37 additionally comprising a base oil selected from the group consisting of conventional PAO, alkylated naphthalene, polyinternalolefin, petroleum derived Group I, petroleum derived Group II, petroleum derived Group III, and mixtures thereof.

39. The method of claim 1 wherein the wormgear lubricant additionally comprises a thickener selected from the group consisting of polyisobutylene, high molecular weight complex esters, butyl rubber, olefin copolymers, styrene-diene polymer, polymethacrylate, and styrene ester.

40. The method of claim 7 wherein the isomerized Fischer-Tropsch derived distillate fraction has a ratio of weight percent molecules with monocycloparaffin functionality to weight percent of molecules with multicycloparaffin functionality greater than 15.

41. The method of claim 40 wherein the ratio of weight percent of molecules with monocycloparaffin functionality to weight percent of molecules with multicycloparaffin functionality is greater than 20.

42. The process of claim 19 wherein the isomerized Fischer-Tropsch distillate fraction has a ratio of pour point in degrees C. to kinematic viscosity at 100 degrees C. in cSt greater than a Base Oil Pour Factor as calculated by the equation: Base Oil Pour Factor=7.35×Ln(Kinematic Viscosity at 100° C.)−18.

43. The process of claim 19 wherein the higher-traction coefficient lubricating base oil has a traction coefficient greater than 0.030, when measured at a kinematic viscosity of 15 cSt and at a slide to roll ratio of 40 percent.

44. The wormgear lubricant of claim 30 wherein the isomerized Fischer-Tropsch derived distillate fraction has a ratio of pour point in degrees C. to kinematic viscosity at 100 degrees C. in cSt greater than a Base Oil Pour Factor as calculated by the equation: Base Oil Pour Factor=7.35×Ln(Kinematic Viscosity at 100° C.)−18.

45. The wormgear lubricant of claim 30 wherein the isomerized Fischer-Tropsch derived distillate fraction has a viscosity index greater than an amount calculated by the equation: Viscosity Index=28×Ln(Kinematic Viscosity at 100° C.)+95.

46. The wormgear lubricant of claim 30 additionally comprising an ultra high viscosity PAO.

* * * * *